US011900875B2

(12) United States Patent
Chen et al.

(10) Patent No.: US 11,900,875 B2
(45) Date of Patent: Feb. 13, 2024

(54) DISPLAY SUBSTRATE AND PREPARATION METHOD THEREOF, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Wenbo Chen, Beijing (CN); Tiaomei Zhang, Beijing (CN); Hong Yi, Beijing (CN); Qingqing Yan, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 173 days.

(21) Appl. No.: 17/637,447

(22) PCT Filed: Apr. 30, 2021

(86) PCT No.: PCT/CN2021/091747

§ 371 (c)(1),
(2) Date: Feb. 22, 2022

(87) PCT Pub. No.: WO2022/227085

PCT Pub. Date: Nov. 3, 2022

(65) Prior Publication Data

US 2023/0351957 A1 Nov. 2, 2023

(51) Int. Cl.
*G09G 3/3233* (2016.01)
*G09G 3/20* (2006.01)
(Continued)

(52) U.S. Cl.
CPC ......... *G09G 3/3233* (2013.01); *G09G 3/2092* (2013.01); *G09G 3/3266* (2013.01);
(Continued)

(58) Field of Classification Search
USPC ........................................................... 345/76
See application file for complete search history.

(56) References Cited

U.S. PATENT DOCUMENTS

2006/0054893 A1 3/2006 Nathan et al.
2008/0158205 A1 7/2008 Park et al.
(Continued)

FOREIGN PATENT DOCUMENTS

CN 101315742 A 12/2008
CN 104536229 A 4/2015
(Continued)

OTHER PUBLICATIONS

Office Action dated Dec. 6, 2022 for Chinese Patent Application No. 202180001058.6 and English Translation.
(Continued)

*Primary Examiner* — Chineyere D Wills-Burns
(74) *Attorney, Agent, or Firm* — Ling Wu; Stephen Yang; Ling and Yang Intellectual Property

(57) ABSTRACT

A display substrate, a preparation method thereof, and a display device are provided. The display substrate includes: a substrate, and a drive structure layer and a light-emitting structure layer that are sequentially stacked on the substrate and located in a display region. The display substrate further includes: M rows of scanning signal lines and M rows of light-emitting signal lines. The light-emitting structure layer includes: M rows and N columns of light-emitting structures. The drive structure layer includes: a pixel circuit array and a drive circuit array that extend in a column direction. The pixel circuit array and the drive circuit array are sequentially arranged in a row direction. The pixel circuit array includes: M rows and N columns of pixel circuits, and the pixel circuits are in one-to-one correspondence with the
(Continued)

light-emitting structures and electrically connected to corresponding light-emitting structures.

20 Claims, 17 Drawing Sheets

(51) Int. Cl.
*G09G 3/3266* (2016.01)
*G09G 3/36* (2006.01)

(52) U.S. Cl.
CPC ... *G09G 3/3677* (2013.01); *G09G 2300/0426* (2013.01); *G09G 2310/0286* (2013.01); *G09G 2310/08* (2013.01); *G09G 2330/021* (2013.01)

(56) References Cited

U.S. PATENT DOCUMENTS

| | | | | |
|---|---|---|---|---|
| 2008/0297055 | A1 | 12/2008 | Miyake et al. | |
| 2014/0368414 | A1 | 12/2014 | Kim et al. | |
| 2016/0163774 | A1 * | 6/2016 | Shieh | H10K 59/1216 257/40 |
| 2017/0184888 | A1 | 6/2017 | Sakamoto et al. | |
| 2018/0284927 | A1 * | 10/2018 | Kim | H10K 59/126 |
| 2019/0164954 | A1 | 5/2019 | Yang et al. | |
| 2020/0166797 | A1 * | 5/2020 | Shih | G02F 1/133514 |
| 2020/0211477 | A1 * | 7/2020 | Lai | G09G 3/3258 |
| 2020/0394371 | A1 * | 12/2020 | Chai | G06F 3/0416 |
| 2021/0056894 | A1 * | 2/2021 | Yang | G09G 3/2014 |
| 2021/0090501 | A1 * | 3/2021 | Wu | G09G 3/3258 |
| 2021/0091321 | A1 * | 3/2021 | Jeon | H10K 50/844 |
| 2021/0159299 | A1 | 5/2021 | Wang et al. | |
| 2021/0256913 | A1 * | 8/2021 | Hao | H10K 59/88 |
| 2021/0366336 | A1 | 11/2021 | Zhu | |
| 2021/0375197 | A1 | 12/2021 | Dai et al. | |
| 2021/0407425 | A1 | 12/2021 | Huang et al. | |
| 2022/0068212 | A1 | 3/2022 | Yao et al. | |
| 2022/0366848 | A1 * | 11/2022 | Huang | G09G 3/3266 |

FOREIGN PATENT DOCUMENTS

| | | | |
|---|---|---|---|
| CN | 107248521 | A | 10/2017 |
| CN | 107993579 | A | 5/2018 |
| CN | 109887985 | A | 6/2019 |
| CN | 110599898 | A | 12/2019 |
| CN | 209980755 | U | 1/2020 |
| CN | 111403465 | A | 7/2020 |
| CN | 111430415 | A | 7/2020 |
| CN | 111477667 | A | 7/2020 |
| CN | 111816691 | A | 10/2020 |
| CN | 112449714 | A | 3/2021 |
| CN | 112542490 | A | 3/2021 |
| CN | 113223420 | A | 8/2021 |
| IN | 109283733 | A | 1/2019 |
| IN | 110033734 | A | 7/2019 |
| KR | 10-2008-0060552 | A | 7/2008 |
| KR | 10-2014-0144935 | A | 12/2014 |

OTHER PUBLICATIONS

Office Action dated Sep. 5, 2022 for Chinese Patent Application No. 202180001058.6 and English Translation.

* cited by examiner

DISPLAY SUBSTRATE AND PREPARATION METHOD THEREOF, AND DISPLAY DEVICE

CROSS-REFERENCE TO RELATED APPLICATION

The present application is a U.S. National Phase Entry of International Application No. PCT/CN2021/091747 having an international filing date of Apr. 30, 2021, the entire content of which is hereby incorporated by reference.

TECHNICAL FIELD

Embodiments of the present disclosure relate to, but are not limited to, the field of display, and more particularly to a display substrate and a display device.

BACKGROUND

The Organic Light Emitting Diode (OLED for short) is one of hotspots in the field of display research today. Compared with the Liquid Crystal Display (LCD for short), the OLED has the advantages such as low energy consumption, low production cost, self-illumination, wide viewing angle and fast response speed, and has been widely used in the field of display such as mobile phones, tablet computers and digital cameras.

With the continuous development of display technologies, a large "screen-to-body ratio (i.e., a ratio of the area of an actual display region to the total area on the display side)" has become one of the appearance characteristics pursued for display devices. Especially for wearable display devices (such as smart watches), based on considerations of portability and viewing angle effects, extreme-narrow bezel or even full-screen display has become an important trend in development.

SUMMARY

The following is a summary about the subject matter described in the present disclosure in detail. The summary is not intended to limit the scope of protection of the claims.

In a first aspect, the present disclosure provides a display substrate, including a display region and a non-display region. The display substrate includes: a substrate, and a drive structure layer and a light-emitting structure layer that are sequentially stacked on the substrate and located in the display region. The display substrate further includes: M rows of scanning signal lines and M rows of light-emitting signal lines. The light-emitting structure layer includes: M rows and N columns of light-emitting structures, the drive structure layer includes a pixel circuit array and a drive circuit array that extend in a column direction; and the pixel circuit array and the drive circuit array are sequentially arranged in a row direction.

The pixel circuit array includes: M rows and N columns of pixel circuits, the pixel circuits are in one-to-one correspondence with the light-emitting structures and electrically connected to corresponding light-emitting structures, and an $i^{th}$ row of pixel circuits are electrically connected to an $i^{th}$ row of scanning signal line and an $i^{th}$ row of light-emitting signal line, where $1 \leq i \leq M$.

The drive circuit array includes: at least one scanning drive circuit and at least one light-emitting drive circuit, the scanning drive circuit is arranged to provide a drive signal to a scanning signal line, and the light-emitting drive circuit is arranged to provide a drive signal to a light-emitting signal line.

In some possible implementation modes, the drive structure layer further includes: a blank circuit array; the blank circuit array is arranged between the pixel circuit array and the drive circuit array.

The blank circuit array includes: multiple blank circuits, the blank circuits being electrically connected to the scanning signal lines and the light-emitting signal lines.

In some possible implementation modes, the display region includes: an arc display boundary at one or more ends. The display region includes a first boundary and a second boundary that are arranged in opposite and a third boundary and a fourth boundary that are arranged in opposite. A length of the first boundary is greater than a length of the third boundary.

The first boundary and the second boundary extend in the column direction and are of a non-linear structure. The arc display boundary is located within the first boundary and the second boundary. The third boundary and the fourth boundary extend in the row direction and are of a linear structure.

At least part of pixel circuits close to the arc display boundary are arranged in an arc shape.

In some possible implementation modes, the pixel circuit array includes: a second pixel circuit array, a first pixel circuit array, and a third pixel circuit array that are sequentially arranged in the row direction; and the drive circuit array includes: a first drive circuit array and a second drive circuit array that are arranged in the row direction.

The first drive circuit array is located between the first pixel circuit array and the second pixel circuit array, and the second drive circuit array is located in the first pixel circuit array and the third pixel circuit array.

Multiple drive circuits in the first drive circuit array and the second drive circuit array are linearly arranged.

In some possible implementation modes, when the drive structure layer further includes a blank circuit array, the blank circuit array includes: a first blank circuit array, a second blank circuit array, a third blank circuit array, and a fourth blank circuit array.

The first blank circuit array is located between the second pixel circuit array and the first drive circuit array, the second blank circuit array is located between the first drive circuit array and the first pixel circuit array, the third blank circuit array is located between the first pixel circuit array and the second drive circuit array, and the fourth blank circuit array is located between the second drive circuit array and the third pixel circuit array.

Multiple blank circuits of the first blank circuit array, the second blank circuit array, the third blank circuit array, and the fourth blank circuit array are linearly arranged.

In some possible implementation modes, the drive circuit array includes: a first drive circuit array and a second drive circuit array that are sequentially arranged in the row direction.

The first drive circuit array is arranged at a side, close to the first boundary of the display region, of the pixel circuit array, and the second drive circuit array is arranged at a side, close to the second boundary of the display region, of the pixel circuit array.

At least part of drive circuits, close to the arc display boundary, in the first drive circuit array are arranged in an arc shape; and at least part of drive circuits, close to the arc display boundary, in the second drive circuit array are arranged in an arc shape.

In some possible implementation modes, when the drive structure layer further includes a blank circuit array, the blank circuit array includes: a first blank circuit array and a second blank circuit array.

The first blank circuit array is located between the first drive circuit array and the pixel circuit array, and the second blank circuit array is located between the pixel circuit array and the second drive circuit array.

At least part of blank circuits, close to the arc display boundary, in the first blank circuit array are arranged in an arc shape; and at least part of blank circuits, close to the arc display boundary, in the second blank circuit array are arranged in an arc shape.

In some possible implementation modes, the first drive circuit array and the second drive circuit array both include: a scanning drive circuit and a light-emitting drive circuit; and the scanning drive circuit and the light-emitting drive circuit in a same drive circuit array are arranged in the row direction.

Alternatively, the first drive circuit array includes: a scanning drive circuit, and the second drive circuit array includes: a light-emitting drive circuit.

In some possible implementation modes, the pixel circuit array includes: a first pixel circuit array and a second pixel circuit array that are sequentially arranged in the row direction; and the drive circuit array includes: a first drive circuit array, a second drive circuit array, and a third drive circuit array that are sequentially arranged in the row direction.

The first pixel circuit array is located between the first drive circuit array and the second drive circuit array, and the second pixel circuit array is located between the second drive circuit array and the third drive circuit array.

At least part of drive circuits, close to the arc display boundary, in the first drive circuit array are arranged in an arc shape; at least part of drive circuits, close to the arc display boundary, in the third drive circuit array are arranged in an arc shape; and multiple drive circuits in the second drive circuit array are linearly arranged.

In some possible implementation modes, the first drive circuit array and the third drive circuit array include: a scanning drive circuit, and the second drive circuit array includes: a light-emitting drive circuit.

In some possible implementation modes, when the drive structure layer further includes a blank circuit array, the blank circuit array includes: a first blank circuit array, a second blank circuit array, a third blank circuit array, and a fourth blank circuit array.

The first blank circuit array is located between the first drive circuit array and the first pixel circuit array, the second blank circuit array is located between the first pixel circuit array and the second drive circuit array, the third blank circuit array is located between the second drive circuit array and the second pixel circuit array, and the fourth blank circuit array is located between the second pixel circuit array and the third drive circuit array.

At least part of blank circuits, close to the arc display boundary, in the first blank circuit array are arranged in an arc shape; multiple blank circuits in the second blank circuit array and the third blank circuit array are linearly arranged; and at least part of blank circuits, close to the arc display boundary, in the fourth blank circuit array are arranged in an arc shape.

In some possible implementation modes, the display substrate further includes a first power line, a second power line and data signal lines that extend in the column direction, and a reset signal line and an initial signal line that extend in the row direction, and the light-emitting structures are electrically connected to the second power line.

The pixel circuits have the same size. A pixel circuit includes: a first pixel transistor to a seventh pixel transistor, and a first pixel capacitor. A control electrode of the first pixel transistor is electrically connected to the reset signal line, a first electrode of the first pixel transistor is electrically connected to a first pixel node, and a second electrode of the first pixel transistor is electrically connected to the initial signal line; a control electrode of the second pixel transistor is electrically connected to a scanning signal line, a first electrode of the second pixel transistor is electrically connected to the first pixel node, and a second electrode of the second pixel transistor is electrically connected to a second pixel node; a control electrode of the third pixel transistor is electrically connected to the first pixel node, a first electrode of the third pixel transistor is electrically connected to a third pixel node, and a second electrode of the third pixel transistor is electrically connected to the second pixel node; a control electrode of the fourth pixel transistor is electrically connected to the scanning signal line, a first electrode of the fourth pixel transistor is electrically connected to a data signal line, and a second electrode of the fourth pixel transistor is electrically connected to the third pixel node; a control electrode of the fifth pixel transistor is electrically connected to a light-emitting signal line, a first electrode of the fifth pixel transistor is electrically connected to the first power line, and a second electrode of the fifth pixel transistor is electrically connected to the third pixel node; a control electrode of the sixth pixel transistor is electrically connected to the light-emitting signal line, a first electrode of the sixth pixel transistor is electrically connected to the second pixel node, and a second electrode of the sixth pixel transistor is electrically connected to a light-emitting structure; a control electrode of the seventh pixel transistor is electrically connected to the scanning signal line, a first electrode of the seventh pixel transistor is electrically connected to the initial signal line, and a second electrode of the seventh pixel transistor is electrically connected to the light-emitting structure; and a first plate of the first pixel capacitor is electrically connected to the first pixel node, and a second plate of the first pixel capacitor is electrically connected to the first power line.

In some possible implementation modes, the display substrate further includes: a first power line that extends in the column direction and a reset signal line and an initial signal line that extend in the row direction.

The blank circuit includes: a first blank transistor to a seventh blank transistor, and a first blank capacitor. A control electrode of the first blank transistor is electrically connected to the reset signal line, a first electrode of the first blank transistor is electrically connected to a first blank node, and a second electrode of the first blank transistor is electrically connected to the initial signal line; a control electrode of the second blank transistor is electrically connected to a scanning signal line, a first electrode of the second blank transistor is electrically connected to the first blank node, and a second electrode of the second blank transistor is electrically connected to a second blank node; a control electrode of the third blank transistor is electrically connected to the first blank node, a first electrode of the third blank transistor is electrically connected to a third blank node, and a second electrode of the third blank transistor is electrically connected to the second blank node; a control electrode of the fourth blank transistor is electrically connected to the scanning signal line, a first electrode of the fourth blank transistor is floating, and a second electrode of the fourth blank transistor is electrically connected to the third blank node; a control electrode of the fifth blank transistor is electrically connected to a light-emitting signal line, a first electrode of the fifth blank transistor is electrically connected to the first power line, and a second electrode of the fifth blank transistor is electrically connected to the third blank node; a control electrode of the sixth blank transistor is electrically connected to the light-emitting signal line, a first electrode of the sixth blank transistor is electrically connected to the second blank node, and a second electrode of the sixth blank transistor is floating or electrically connected to the first power line; a control electrode of the seventh blank transistor is electrically connected to the scanning signal line, a first electrode of the seventh blank transistor is electrically connected to the initial signal line, and a second electrode of the seventh blank transistor is floating or electrically connected to the first power line; and a first plate of the first blank capacitor is electrically connected to the first blank node, and a second plate of the first blank capacitor is electrically connected to the first power line.

In some possible implementation modes, the display substrate further includes: a third power line, a fourth power line, a first scanning clock signal line, a second scanning clock signal line, and a scanning initial signal line that extend in the column direction.

The scanning drive circuit includes: multiple cascaded first shift registers that are sequentially arranged in the column direction, and each first shift resister includes: a first scan transistor to an eighth scan transistor, a first scanning capacitor, a second scanning capacitor, a scanning signal input terminal, a scanning signal output terminal, a first scanning clock signal terminal, a second scanning clock signal terminal, a first scanning power terminal, and a second scanning power terminal.

A control electrode of the first scan transistor is electrically connected to the first scanning clock signal terminal, a first electrode of the first scan transistor is electrically connected to the scanning signal input terminal, and a second electrode of the first scan transistor is electrically connected to a first scan node; a control electrode of the second scan transistor is electrically connected to the first scan node, a first electrode of the second scan transistor is electrically connected to the first scanning clock signal terminal, and a second electrode of the second scan transistor is electrically connected to a second scan node; a control electrode of the third scan transistor is electrically connected to the first scanning clock signal terminal, a first electrode of the third scan transistor is electrically connected to the second scanning power terminal, and a second electrode of the third scan transistor is electrically connected to the second scan node; a control electrode of the fourth scan transistor is electrically connected to the second scan node, a first electrode of the fourth scan transistor is electrically connected to the first scanning power terminal, and a second electrode of the fourth scan transistor is electrically connected to the scanning signal output terminal; a control electrode of the fifth scan transistor is electrically connected to a third scan node, a first electrode of the fifth scan transistor is electrically connected to the scanning signal output terminal, and a second electrode of the fifth scan transistor is electrically connected to the second scanning clock signal terminal; a control electrode of the sixth scan transistor is electrically connected to the second scan node, a first electrode of the sixth scan transistor is electrically connected to the first scanning power terminal, and a second electrode of the sixth scan transistor is electrically connected to a first electrode of the seventh scan transistor; a control electrode of the seventh scan transistor is electrically connected to the second scanning clock signal terminal, and a second electrode of the seventh scan transistor is electrically connected to the first scan node; a control electrode of the eighth scan transistor is electrically connected to the second scanning power terminal, a first electrode of the eighth scan transistor is electrically connected to the first scan node, and a second electrode of the eighth scan transistor is electrically connected to the third scan node; a first plate of the first scanning capacitor is electrically connected to the first scanning power terminal, and a second plate of the first scanning capacitor is electrically connected to the second scan node; and a first plate of the second scanning capacitor is electrically connected to the scanning signal output terminal, and a second plate of the second scanning capacitor is electrically connected to the third scan node.

A scanning signal input terminal of a first-stage first shift register is electrically connected to the scanning initial signal line, a scanning signal output terminal of an $(i-1)^{th}$-stage first shift register is electrically connected to a scanning signal input terminal of an $i^{th}$-stage first shift register, first scanning power terminals of all the first shift registers are electrically connected to the third power line, second scanning power terminals of the first shift registers are electrically connected to the fourth power line, a first scanning clock signal terminal of an odd-stage first shift register is electrically connected to the first scanning clock signal line, a second scanning clock signal terminal of the odd-stage first shift register is electrically connected to the second scanning clock signal line, a first scanning clock signal terminal of an even-stage first shift register is electrically connected to the second scanning clock signal line, a second scanning clock signal terminal of the even-stage first shift register is electrically connected to the first scanning clock signal line, a scanning signal output terminal of a first shift register is electrically connected to a scanning signal line, where i is a positive integer greater than or equal to 2.

In some possible implementation modes, the display substrate further includes: a third power line, a fourth power line, a first light-emitting clock signal line, a second light-emitting clock signal line, and a light-emitting initial signal line that extend in the column direction.

The light-emitting drive circuit includes: multiple cascaded second shift registers that are sequentially arranged in the column direction, and each second shift register includes: a first light-emitting transistor to a tenth light-emitting transistor, a first light-emitting capacitor to a third light-emitting capacitor, a light-emitting signal input terminal, a light-emitting signal output terminal, a first light-emitting clock signal terminal, a second light-emitting clock signal terminal, a first light-emitting power terminal, and a second light-emitting power terminal.

A control electrode of the first light-emitting transistor is electrically connected to the first light-emitting clock signal terminal, a first electrode of the first light-emitting transistor is electrically connected to the light-emitting signal input terminal, and a second electrode of the first light-emitting transistor is electrically connected to a first light-emitting node; a control electrode of the second light-emitting transistor is electrically connected to the first light-emitting node, a first electrode of the second light-emitting transistor is electrically connected to the first light-emitting clock signal terminal, and a second electrode of the second light-emitting transistor is electrically connected to a second light-emitting node; a control electrode of the third light-emitting transistor is electrically connected to the first light-emitting clock signal terminal, a first electrode of the third light-emitting transistor is electrically connected to the second light-emitting power terminal, and a second electrode of the third light-emitting transistor is electrically connected to the second light-emitting node; a control electrode of the fourth light-emitting transistor is electrically connected to the second light-emitting clock signal terminal, a first electrode of the fourth light-emitting transistor is electrically connected to the first light-emitting node, and a second electrode of the fourth light-emitting transistor is electrically connected to a first electrode of the fifth light-emitting transistor; a control electrode of the fifth light-emitting transistor is electrically connected to the second light-emitting node, and a second electrode of the fifth light-emitting transistor is electrically connected to the first light-emitting power terminal; a control electrode of the sixth light-emitting transistor is electrically connected to the second light-emitting node, a first electrode of the sixth light-emitting transistor is electrically connected to the second light-emitting clock signal terminal, and a second electrode of the sixth light-emitting transistor is electrically connected to a third light-emitting node; a control electrode of the seventh light-emitting transistor is electrically connected to the second light-emitting clock signal terminal, a first electrode of the seventh light-emitting transistor is electrically connected to the third light-emitting node, and a second electrode of the seventh light-emitting transistor is electrically connected to a fourth light-emitting node; a control electrode of the eighth light-emitting transistor is electrically connected to the first light-emitting node, a first electrode of the eighth light-emitting transistor is electrically connected to the first light-emitting power terminal, and a second electrode of the eighth light-emitting transistor is electrically connected to the fourth light-emitting node; a control electrode of the ninth light-emitting transistor is electrically connected to the fourth light-emitting node, a first electrode of the ninth light-emitting transistor is electrically connected to the light-emitting signal output terminal, and a second electrode of the ninth light-emitting transistor is electrically connected to the first light-emitting power terminal; a control electrode of the tenth light-emitting transistor is electrically connected to the first light-emitting node, a first electrode of the tenth light-emitting transistor is electrically connected to the second light-emitting power terminal, and a second electrode of the tenth light-emitting transistor is electrically connected to the light-emitting signal output terminal; a first plate of the first light-emitting capacitor is electrically connected to the second light-emitting node, a second plate of the first light-emitting capacitor is electrically connected to the third light-emitting node; a first plate of the second light-emitting capacitor is electrically connected to the first light-emitting node, and a second plate of the second light-emitting capacitor is electrically connected to the second light-emitting clock signal terminal; and a first plate of the third light-emitting capacitor is electrically connected to the fourth light-emitting node, and a second plate of the third light-emitting capacitor is electrically connected to the first light-emitting power terminal.

A light-emitting signal input terminal of a first-stage second shift register is electrically connected to the light-emitting initial signal line, a light-emitting signal output terminal of an $(i-1)^{th}$-stage second shift register is electrically connected to a light-emitting signal input terminal of an $i^{th}$-stage second shift register, first light-emitting power terminals of all the second shift registers are electrically connected to the third power line, second light-emitting power terminals of the second shift registers are electrically connected to the fourth power line, a first light-emitting clock signal terminal of an odd-stage second shift register is electrically connected to the first light-emitting clock signal line, a second light-emitting clock signal terminal of the odd-stage second shift register is electrically connected to the second light-emitting clock signal line, a first light-emitting clock signal terminal of an even-stage second shift register is electrically connected to the second light-emitting clock signal line, a second light-emitting clock signal terminal of the even-stage second shift register is electrically connected to the first light-emitting clock signal line, and a light-emitting signal output terminal of a second shift register is electrically connected to a light-emitting signal line, where i is a positive integer greater than or equal to 2.

In some possible implementation modes, the light-emitting structure layer includes: a first electrode layer, a pixel defining layer, a light-emitting layer, and a second electrode layer that are sequentially stacked on the drive structure layer; the first electrode layer includes: multiple first electrodes, the light-emitting layer includes: multiple organic light-emitting layers, the second electrode layer includes: multiple second electrodes, and each light-emitting structure includes: a first electrode, an organic light-emitting layer, and a second electrode.

For each pixel circuit, an orthographic projection of the second electrode of the sixth pixel transistor on the substrate and an orthographic projection of the first electrode in the light-emitting structure connected to the pixel circuit on the substrate have no overlap.

The drive structure layer further includes: a connection electrode. The connection electrode is located between the pixel circuit and the light-emitting structure, and is electrically connected to the second electrode of the sixth pixel transistor in the pixel circuit and the first electrode in the light-emitting structure, respectively.

In some possible implementation modes, the connection electrode includes: a first connecting portion and a second connecting portion.

The first connecting portion is arranged on a side, close to the substrate, of the second connecting portion, the first connecting portion is electrically connected to the second electrode of the sixth pixel transistor in the pixel circuit and the second connecting portion, respectively, and the second connecting portion is electrically connected to the first electrode in the light-emitting structure.

The first connecting portion and the second connecting portion are of an integrated structure, or the first connecting portion is a metal electrode, and the second connecting portion is a transparent electrode.

In some possible implementation modes, the display substrate further includes: an encapsulation layer and a spacer.

The encapsulation layer is arranged on a side, away from the substrate, of the light-emitting structure, and the spacer is arranged on a side, away from the substrate, of the encapsulation layer.

In some possible implementation modes, when the first connecting portion and the second connecting portion are of an integrated structure, the drive structure layer includes: a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, and a third planarization layer that are sequentially stacked on the substrate.

The semiconductor layer includes: active layers of multiple pixel transistors, active layers of multiple blank transistors, active layers of multiple scan transistors, and active layers of multiple light-emitting transistors; the first metal layer includes: a lighting signal line, a scanning signal line, a reset signal line, a first plate of a first pixel capacitor, a second plate of a first scanning capacitor, a second plate of a second scanning capacitor, a first plate of a first light-emitting capacitor, a first plate of a second light-emitting capacitor, a second plate of a third light-emitting capacitor, control electrodes of the multiple pixel transistors, control electrodes of the multiple blank transistors, control electrodes of the multiple scan transistors, and control electrodes of the multiple light-emitting transistors; the second metal layer includes: an initial signal line, a second plate of the first pixel capacitor, a first plate of the first scanning capacitor, a first plate of the second scanning capacitor, a second plate of the first light-emitting capacitor, a second plate of the second light-emitting capacitor, and a first plate of the third light-emitting capacitor; the third metal layer includes: a third power line, a fourth power line, a first scanning clock signal line, a second scanning clock signal line, a first light-emitting clock signal line, a second light-emitting clock signal line, a scanning initial signal line, a light-emitting initial signal line, first and second electrodes of the multiple pixel transistors, first and second electrodes of the multiple blank transistors, first and second electrodes of the multiple scan transistors, and first and second electrodes of the multiple light-emitting transistors; the fourth metal layer includes: a data signal line and a first power line; and the fifth metal layer includes: the connection electrode.

An orthographic projection of the first power line on the substrate at least partially overlaps with an orthographic projection of the first pixel capacitor on the substrate.

In some possible implementation modes, when the first connecting portion is a metal electrode and the second connecting portion is a transparent electrode, the drive structure layer includes: a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, a transparent conductive layer, and a third planarization layer that are sequentially stacked on the substrate.

The semiconductor layer includes: active layers of multiple pixel transistors, active layers of multiple blank transistors, active layers of multiple scan transistors, and active layers of multiple light-emitting transistors; the first metal layer includes: a light-emitting signal line, a scanning signal line, a reset signal line, a first plate of a first pixel capacitor, a second plate of a first scanning capacitor, a second plate of a second scanning capacitor, a first plate of a first light-emitting capacitor, a first plate of a second light-emitting capacitor, a second plate of a third light-emitting capacitor, control electrodes of the multiple pixel transistors, control electrodes of the multiple blank transistors, control electrodes of the multiple scan transistors, and control electrodes of multiple light-emitting transistors; the second metal layer includes: an initial signal line, a second plate of the first pixel capacitor, a first plate of the first scanning capacitor, a first plate of the second scanning capacitor, a second plate of the first light-emitting capacitor, a second plate of the second light-emitting capacitor, and a first plate of the third light-emitting capacitor; the third metal layer includes: a third power line, a fourth power line, a first scanning clock signal line, a second scanning clock signal line, a first light-emitting clock signal line, a second light-emitting clock signal line, a scanning initial signal line a light-emitting initial signal line, first and second electrodes of the multiple pixel transistors, first and second electrodes of the multiple blank transistors, first and second electrodes of the multiple scan transistors, and first and second electrodes of the multiple light-emitting transistors; the fourth metal layer includes: a data signal line and a first power line; the fifth metal layer includes: the first connecting portion, and the transparent conductive layer includes: the second connecting portion.

An orthographic projection of the first power line on the substrate at least partially overlaps with an orthographic projection of the first pixel capacitor on the substrate.

In a second aspect, the present disclosure also provides a display device, including the abovementioned display substrate.

In a third aspect, the present disclosure also provides a preparation method for a display substrate. The preparation method is configured to prepare the abovementioned display substrate. The method includes: providing a substrate; forming, on the substrate, M rows of scanning signal lines and M rows of light-emitting signal lines and a drive structure layer in a display region; wherein the drive structure layer includes: a pixel circuit array and a driving circuit array that extend in a column direction; the pixel circuit array and the drive circuit array are sequentially arranged in a row direction; the pixel circuit array includes: M rows and N columns of pixel circuits, an $i^{th}$ row of pixel circuits are electrically connected to an $i^{th}$ row of scanning signal line and an $i^{th}$ row of light-emitting signal line, where $1 \le i \le M$; the drive circuit array includes: at least one scanning drive circuit and at least one light-emitting drive circuit, the scanning drive circuit is arranged to provide a drive signal to a scanning signal line, and the light-emitting drive circuit is arranged to provide a drive signal to a light-emitting signal line; and forming a light-emitting structure layer on the drive structure layer; wherein the light-emitting structure layer includes: M rows and N columns of light-emitting structures, the pixel circuits are in one-to-one correspondence with the light-emitting structures and are electrically connected to corresponding light-emitting structures.

In some possible implementation modes, forming the drive structure layer in the display region on the substrate includes: sequentially forming a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, and a third planarization layer on the substrate; or, sequentially forming a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, a transparent conductive layer, and a third planarization layer on the substrate.

Forming the light-emitting structure layer on the drive structure layer includes: sequentially forming a first electrode layer, a pixel defining layer, a light-emitting layer, and a second electrode layer on the drive structure layer.

After forming the light-emitting structure layer on the drive structure layer, the method further includes: forming an encapsulation layer and a spacer on the light-emitting structure layer.

After the drawings and the detailed description are read and understood, other aspects may be comprehended.

BRIEF DESCRIPTION OF DRAWINGS

The accompany drawings are used to provide further understanding of the technical solution of the present disclosure, and form a part of the description, and together with embodiments of the present disclosure, are used to explain the technical solution of the present disclosure, and do not form limitation to the technical solution of the present disclosure.

DETAILED DESCRIPTION

Figure 1:
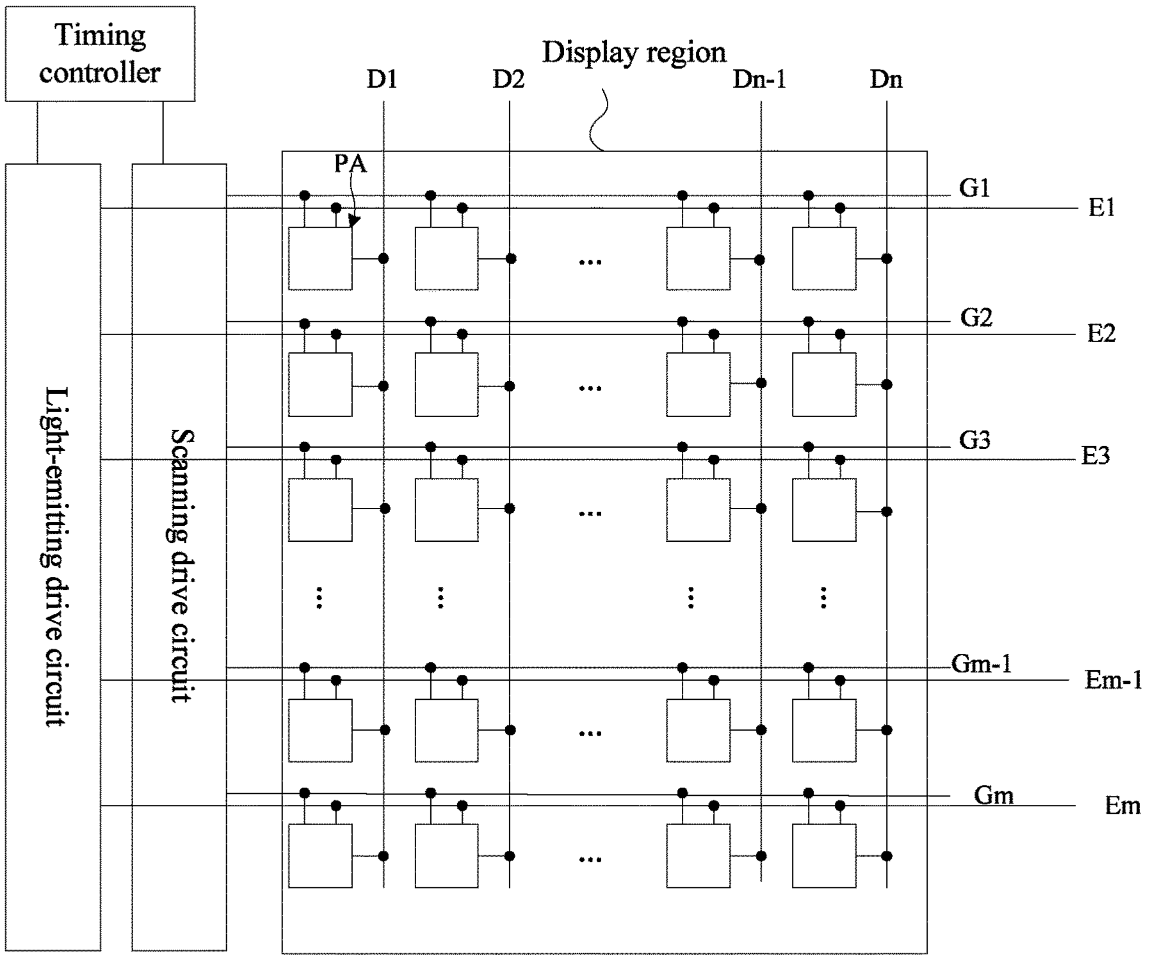
FIG. 1 is a schematic diagram of a structure of a display substrate.

The present disclosure describes multiple embodiments, but the description is exemplary rather than restrictive. For those of ordinary skill in the art, more embodiments and implementations may be included in the scope of the embodiments described in the present disclosure. Although many possible combinations of features are shown in the accompanying drawings and discussed in specific implementations, many other combinations of the disclosed features are possible. Unless expressly limited, any feature or element of any embodiment may be used in combination with, or may be used to replace, any other feature or element in any other embodiment.

The present disclosure includes and conceives of combinations with the features and elements known to those of ordinary skill in the art. The embodiments, features and elements that have been disclosed in the present disclosure can also be combined with any conventional features or elements to form technical solutions defined by the claims. Any features or elements of any embodiment may also be combined with features or elements from other technical solutions to form another technical solution defined by the claims. Therefore, it should be understood that any of the features shown and/or discussed in the present disclosure may be embodied alone or in any suitable combination. Therefore, the embodiments are not to be limited except the limitation by the appended claims and their equivalents. Furthermore, various modifications and variations may be made within the scope of the appended claims.

Unless otherwise specified, the technical or scientific terms used in the present disclosure shall have the ordinary meanings understood by those of ordinary skill in the art to which the present disclosure belongs. The "first," "second," and similar terms used in the present disclosure do not indicate any order, number, or importance, but are used only for distinguishing different components. "Comprise" or "include" and similar terms mean that an element or object appearing before the term includes the elements or objects listed after the term and their equivalents, and does not exclude other components or objects. Terms like "connect" or "mutually connect" are not limited to physical or mechanical connection, but may include electrical connection, whether direct or indirect. "Up", "down", "left", "right", and the like are only used to indicate the relative positional relationship. When the absolute position of a described object changes, the relative positional relationship may also change correspondingly.

To make the objectives, technical solutions, and advantages of the present disclosure clearer, the embodiments of the present disclosure will be described in detail below in combination with the accompany drawings. It is to be noted that the implementation modes may be implemented in various forms. Those of ordinary skill in the art can easily understand such a fact that modes and contents may be transformed into various forms without departing from the purpose and scope of the present disclosure. Therefore, the present disclosure should not be interpreted as being limited to the contents recorded in the following implementation modes only. The embodiments and features in the embodiments of the present disclosure may be randomly combined with each other if there is no conflict.

In the accompanying drawings, the sizes of various constituents, the thicknesses of layers, or regions may be exaggerated sometimes for clarity. Therefore, a mode of the present disclosure may not be limited to the sizes, and the shapes and sizes of various components in the accompanying drawings do not reflect the true scale. In addition, the accompanying drawings schematically illustrate ideal examples, and a mode of the present disclosure is not limited to shapes, numerical values, or the like shown in the drawings.

Ordinal numerals "first", "second", "third", etc., in the specification are set to avoid the confusion of constituents, but not to form limitation in quantity.

In the specification, for convenience, expressions "central", "above", "below", "front", "back", "vertical", "horizontal", "top", "bottom", "inside", "outside", etc., indicating directional or positional relationships are used to explain positional relationships between constituents, not to indicate or imply that involved devices or elements must have the specific orientations and be constructed and operated with the specific orientations, but only to facilitate describing the present specification and simplifying the description, and thus should not be understood as limitation to the present disclosure. The positional relationship between constituents may be changed appropriately according to the direction of each constituent described. Therefore, appropriate variations based on situations are allowed, not limited to the expressions in the specification.

In the specification, unless otherwise specified and defined, terms "mounting", "mutual connection", and "connection" should be understood broadly. For example, it may be fixed connection, or detachable connection, or integrated connection. It may be mechanical connection or electric connection. It may be direct connection, or indirect connection through an intermediate, or communication inside two elements. Those of ordinary skill in the art can understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain electrode) and the source electrode (source electrode terminal, source region, or source electrode), and a current may flow through the drain electrode, the channel region, and the source region. It is to be noted that in the specification, the channel region refers to a region that a current mainly flows through.

In the specification, a first electrode may be a drain electrode, and a second electrode may be a source electrode. Alternatively, the first electrode may be a source electrode, and the second electrode may be a drain electrode. In cases that transistors with opposite polarities are used, or a current direction changes during work of a circuit, or the like, functions of the "source electrode" and the "drain electrode" may sometimes be exchanged. Therefore, the "source electrode" and the "drain electrode" may be exchanged in the specification.

In the specification, "electric connection" includes the case that constituents are connected through an element with a certain electric action. "An element with a certain electric action" is not particularly limited as long as electric signals between the connected constituents may be sent and received. Examples of "an element with a certain electric action" not only include an electrode and a line, but also include a switch element such as a transistor, a resistor, an inductor, a capacitor, other elements with various functions, and the like.

In the specification, "parallel" refers to a state that an angle formed by two straight lines is larger than −10° and smaller than 10°, and thus also includes a state that the angle is larger than −5° and smaller than 5°. In addition, "perpendicular" refers to a state that an angle formed by two straight lines is larger than 80° and smaller than 100°, and thus also includes a state that the angle is larger than 85° and smaller than 95°.

In the specification, "film" and "layer" may be exchanged. For example, "conductive layer" may be replaced with "conductive film" sometimes. Similarly, "insulating film" may be replaced with "insulating layer" sometimes.

In the present disclosure, "about" refers to that a boundary is not strictly defined and numerical values in ranges of process and measurement errors are allowed.

FIG. 1 is a schematic diagram of a structure of a display substrate. As shown in FIG. 1, the display substrate includes a display region and a non-display region. The display substrate may include a timing controller, a data drive circuit, a scanning drive circuit, a light-emitting drive circuit, and a pixel array that are arranged on a substrate and located in the non-display region. The display substrate may also include multiple scanning signal lines (G1 to Gm), multiple data signal lines (D1 to Dn), multiple light-emitting signal lines (E1 to Em), and multiple sub-pixels PA.

In an exemplary embodiment, the timing controller may provide a gray-scale value and a control signal suitable for a standard of the data drive circuit to the data drive circuit, provide a clock signal, a scanning start signal, etc., suitable for a standard of the scanning drive circuit to the scanning drive circuit, and provide a clock signal, an emission stop signal, etc., suitable for a standard of the light-emitting drive circuit to the light-emitting drive circuit. The data drive circuit may generate a data voltage to be provided to data signal lines D1, D2, D3, . . . and Dn by using the gray-scale value and the control signal received from the timing controller. For example, the data drive circuit may sample the gray-scale value by using the clock signal and apply the data voltage corresponding to the gray-scale value to the data signal lines D1 to Dn, taking a sub-pixel row as a unit, where n may be a natural number. The scanning drive circuit may receive the clock signal, the scanning start signal, etc., from the timing controller to generate a scanning signal to be provided to the scanning signal lines G1, G2, G3, . . . and Gm. For example, the scanning drive circuit may sequentially provide a scanning signal with an on-level pulse to the scanning signal lines G1 to Gm. For example, the scanning drive circuit may be constructed in a form of a shift register and sequentially transmit the scanning start signal provided in a form of an on-level pulse to a next-stage circuit to generate a scanning signal under the control of the clock signal, where m may be a natural number. The light-emitting drive circuit may receive the clock signal, the emission stop signal, etc., from the timing controller to generate an emission signal to be provided to the light-emitting signal lines E1, E2, E3, . . . and Em. For example, the light-emitting drive circuit may sequentially provide an emission signal with an off-level pulse to the light-emitting signal lines E1 to Em. For example, the light-emitting drive circuit may be constructed in a form of a shift register and sequentially transmit the emission stop signal provided in a form of an off-level pulse to a next-stage circuit to generate a light-emitting signal under the control of the clock signal. Each sub-pixel may be connected to a corresponding data signal line, a corresponding scanning signal line, and a corresponding light-emitting signal line.

In an exemplary embodiment, each sub-pixel includes: a pixel circuit and a light-emitting structure. The pixel circuit is electrically connected to the light-emitting structure, and arranged to drive the light-emitting structure to emit light.

In a display substrate, the light-emitting drive circuit and the scanning drive circuit are arranged in the non-display region, and as a result, the display substrate cannot achieve the narrow bezel.

Figure 2:
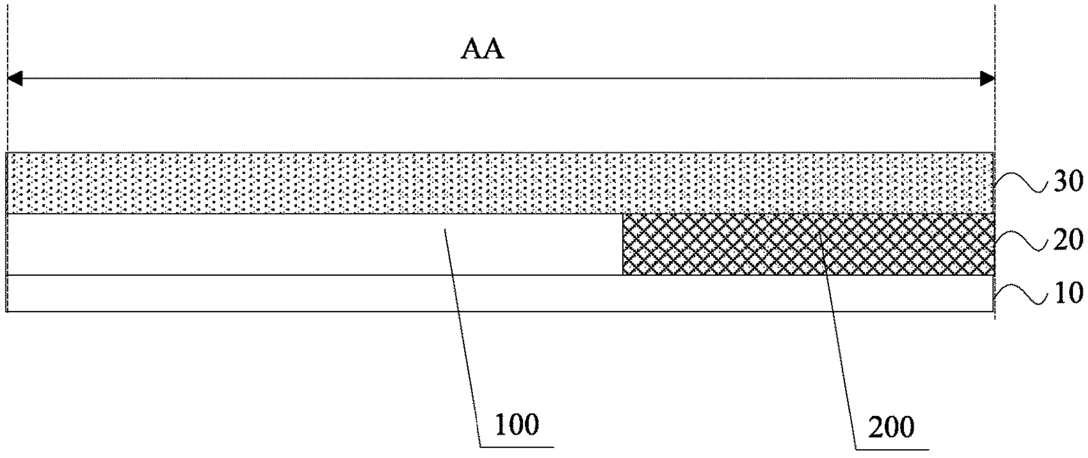
FIG. 2 is a schematic diagram of a structure of a display substrate according to an embodiment of the present disclosure.

FIG. 2 is a schematic diagram of a structure of a display substrate according to an embodiment of the present disclosure. As shown in FIG. 2, a display substrate according to an embodiment of the present disclosure may include: a display region AA and a non-display region. The display substrate includes: a substrate 10, and a drive structure layer 20 and a light-emitting structure layer 30 that are sequentially stacked on the substrate 10 and located in the display region AA. The display substrate further includes: M rows of scanning signal lines and M rows of light-emitting signal lines. The drive structure layer 20 includes a pixel circuit array 100 and a drive circuit array 200 that extend in a column direction; and the pixel circuit array 100 and the drive circuit array 200 are sequentially arranged in a row direction. The light-emitting structure layer 30 includes: M rows and N columns of light-emitting structures.

The pixel circuit array may include: M rows and N columns of pixel circuits. The pixel circuits are in one-to-one correspondence with the light-emitting structures and electrically connected to the corresponding light-emitting structures, and an $i^{th}$ row of pixel circuits are electrically connected to an $i^{th}$ row of scanning signal line and an $i^{th}$ row of light-emitting signal line, where $1 \leq i \leq M$. The drive circuit array includes: at least one scanning drive circuit and at least one light-emitting drive circuit, the scanning drive circuit is arranged to provide a drive signal to a scanning signal line, and the light-emitting drive circuit is arranged to provide a drive signal to a light-emitting signal line.

In an exemplary embodiment, the substrate 10 may be a rigid substrate or a flexible substrate. The rigid substrate may be, but not limited to, one or more of glass and metal foil. The flexible substrate may be, but not limited to, one or more of polyethylene terephthalate, ethylene terephthalate, polyether ether ketone, polystyrene, polycarbonate, poly (aromatic acid ester), polyarylester, polyimide, polyvinyl chloride, polyethylene, and textile fibers.

In an exemplary embodiment, the scanning signal lines and the light-emitting signal lines may be arranged in the display region.

In an exemplary embodiment, intersection between the row direction and the column direction refers to an included angle about 70° to 90° between the row direction and the column direction. The column direction and the row direction may be in the same plane. For example, the row direction may refer to a row direction parallel to an extension direction of a scan line; and the column direction may refer to a column direction parallel to an extension direction of a data line.

In an exemplary embodiment, a pixel circuit and a light-emitting structure may constitute a sub-pixel. The sub-pixel may be any one of a red (R) sub-pixel, a green (G) sub-pixel, a blue (B) sub-pixel, and a white sub-pixel, which is not limited in the present disclosure. When a display panel includes the red (R) sub-pixel, the green (G) sub-pixel, and the blue (B) sub-pixel, the three sub-pixels can be arranged in parallel in a horizontal direction, in parallel in a vertical direction, or in a manner like the Chinese character "品". When a display panel includes the red (R) sub-pixel, the green (G) sub-pixel, the blue (B) sub-pixel, and the white sub-pixel, the four sub-pixels can be arranged in parallel in a horizontal direction, in parallel in a vertical direction, or in an array. No limits are made thereto in the present disclosure.

In an exemplary embodiment, the light-emitting structure may be an organic light-emitting diode (OLED).

Figure 3:
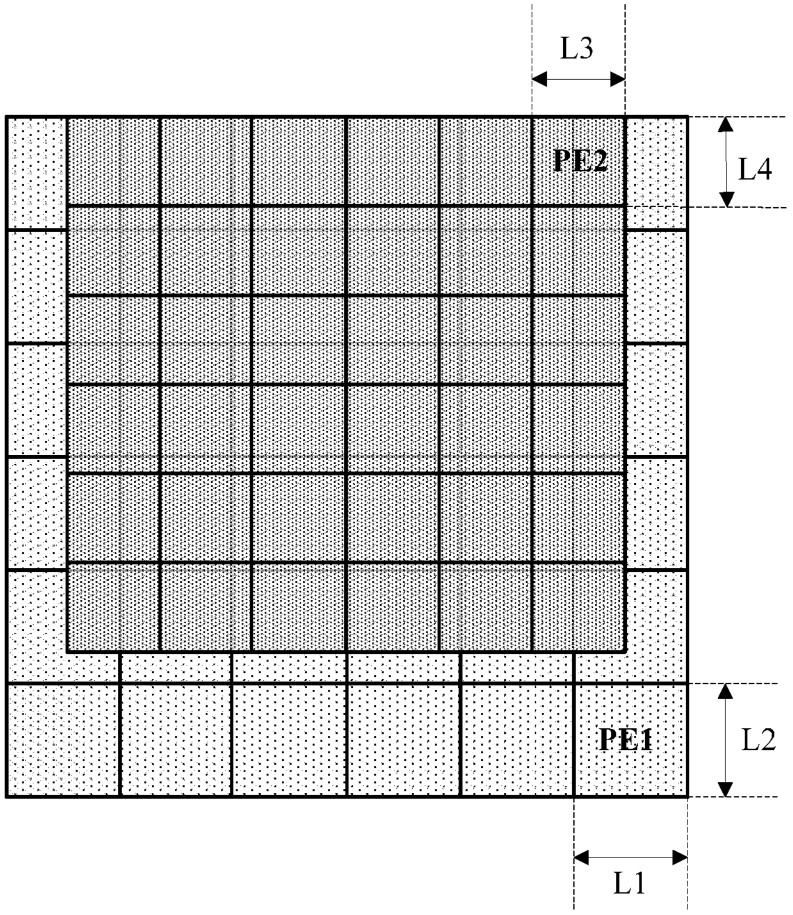
FIG. 3 is a first diagram of size comparison between a pixel circuit in the display substrate provided in FIG. 1 and a pixel circuit in the display substrate provided in FIG. 2.
Figure 4:
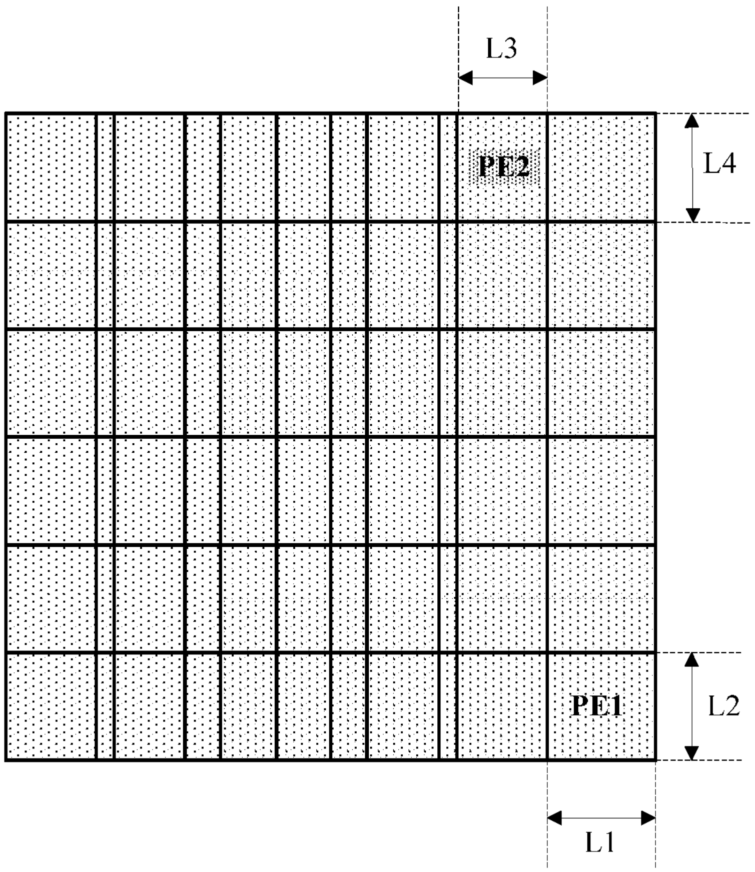
FIG. 4 is a second diagram of size comparison between a pixel circuit in the display substrate provided in FIG. 1 and a pixel circuit in the display substrate provided in FIG. 2.

FIG. 3 is a first diagram of size comparison between a pixel circuit in the display substrate provided in FIG. 1 and a pixel circuit in the display substrate provided in FIG. 2. FIG. 4 is a second diagram of size comparison between a pixel circuit in the display substrate provided in FIG. 1 and a pixel circuit in the display substrate provided in FIG. 2. As shown in FIG. 3 and FIG. 4, compared with the display substrate provided in FIG. 1, the light-emitting structure of the display substrate provided in FIG. 2 remains unchanged. In order to be able to arrange a drive circuit array in the display region, the pixel circuit in FIG. 2 is an equal-proportional zoom-out of the pixel circuit in FIG. 1. The equal-proportional zoom-out may include: an equal-proportional zoom-out in the row direction or an equal-proportional zoom-out in the column direction. FIG. 3 shows a pixel circuit PE2 provided in FIG. 2 is formed through equal-proportional zoom-out in the row and column directions from a pixel circuit PE1 in the display substrate provided in FIG. 1. L3=L1×k, and L4=L2×k. FIG. 4 shows the pixel circuit PE2 provided in FIG. 2 is formed through equal-proportional zoom-out in the row direction from the pixel circuit PE1 in the display substrate provided in FIG. 1. L3=L1×k, and L4=L2. L1 is a length of PE1 in the row direction, L2 is a length of PE1 in the column direction, L3 is a length of PE2 in the row direction, L4 is a length of PE2 in the column direction, and k is a zoom-out ratio, where $0<k\leq 1$.

The display substrate according to the embodiment of the present disclosure includes: a display region and a non-display region. The display substrate includes: a substrate, and a drive structure layer and a light-emitting structure layer that are sequentially stacked on the substrate and located in the display region. The display substrate further includes: M rows of scanning signal lines and M rows of light-emitting signal lines. The light-emitting structure layer includes: M rows and N columns of light-emitting structures. The drive structure layer includes: a pixel circuit array and a drive circuit array that extend in a column direction. The pixel circuit array and the drive circuit array are sequentially arranged in a row direction. The pixel circuit array includes: M rows and N columns of pixel circuits, and the pixel circuits are in one-to-one correspondence with the light-emitting structures and electrically connected to the corresponding light-emitting structures. An $i^{th}$ row of pixel circuits are electrically connected to an $i^{th}$ row of scanning signal line and an $i^{th}$ row of light-emitting signal line, where $1 \leq i \leq M$. The drive circuit array includes: at least one scanning drive circuit and at least one light-emitting drive circuit, the scanning drive circuit is arranged to provide a drive signal to a scanning signal line, and the light-emitting drive circuit is arranged to provide a drive signal to a light-emitting signal line. According to the embodiment of the present disclosure, the drive circuit array is arranged in the display region, so that a width of the non-display region is reduced, and a narrow bezel can be realized.

In an exemplary embodiment, the area of each pixel circuit may be the same, which ensures that a load of each pixel circuit is the same, so that the risk of abnormal display may be avoided to a large extent.

Figure 5:
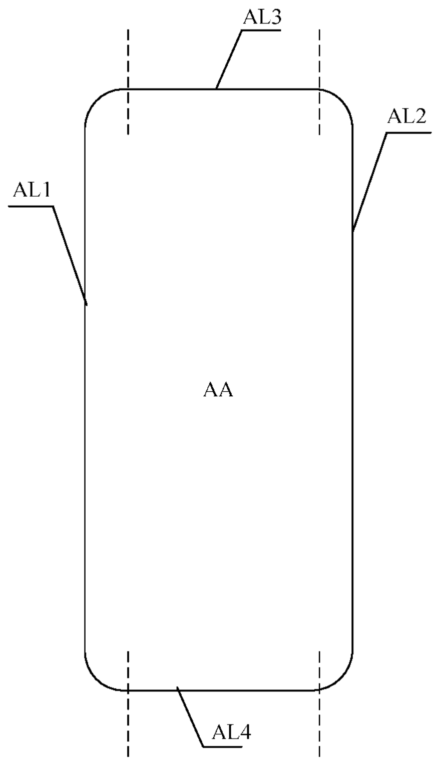
FIG. 5 is a schematic diagram of a structure of a display region according to an exemplary embodiment.

FIG. 5 is a schematic diagram of a structure of a display region according to an exemplary embodiment. As shown in FIG. 5, the display region includes an arc display boundary, and the display region may include: a first boundary AL1 and a second boundary AL2 arranged in opposite, and a third boundary AL3 and a fourth boundary AL4 arranged in opposite. A length of the first boundary AL1 is greater than a length of the third boundary AL3. The first boundary AL1 and the second boundary AL2 extend in the column direction and are of a non-linear structure. The arc display boundary is within the first boundary AL1 and the second boundary AL2. The third boundary AL3 and the fourth boundary AL4 extend in the row direction and are of a linear structure.

In an exemplary embodiment, at least part of pixel circuits close to the arc display boundary are arranged in an arc shape.

In an exemplary embodiment, a shape of the display region AA may be a rectangle with rounded corners, which is not limited in the present disclosure.

Figure 6:
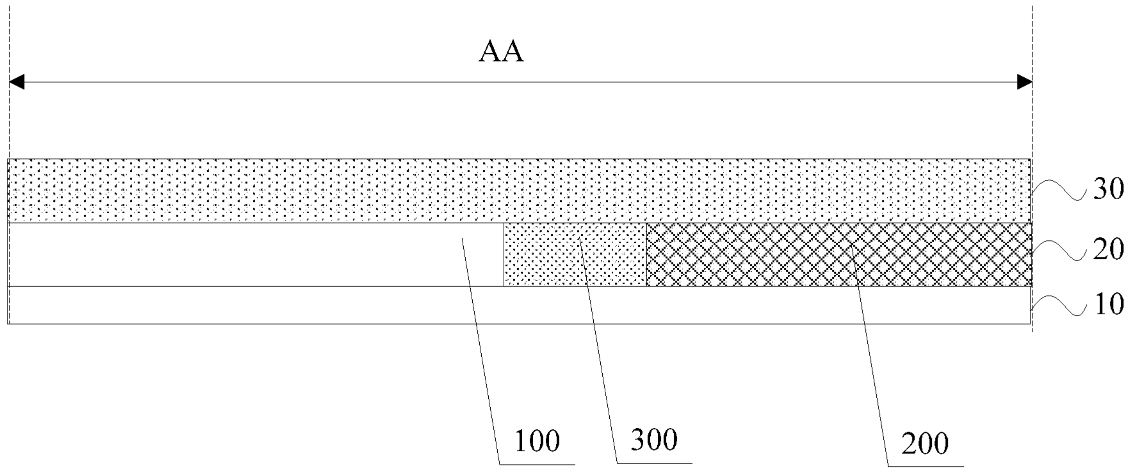
FIG. 6 is a sectional view of a display substrate according to an exemplary embodiment.

FIG. 6 is a sectional view of a display substrate according to an exemplary embodiment. As shown in FIG. 6, in some exemplary embodiments, the drive structure layer further includes: a blank circuit array 300. The blank circuit array is arranged between the pixel circuit array 100 and the drive circuit array 200. The blank circuit array includes: multiple blank circuits, the blank circuits being electrically connected to the scanning signal lines and the light-emitting signal lines. Arrangement of the blank circuit array in the present disclosure may fully ensure the uniformity of pixel circuit driven display.

In an exemplary embodiment, the display substrate may include: M rows and K columns of blank circuits, an $i^{th}$ row of blank circuits being electrically connected to an $i^{th}$ row of scanning signal line and an $i^{th}$ row of light-emitting signal line.

In an exemplary embodiment, a value of K may be determined according to a size of the display substrate and signals of various signal lines.

Figure 7:
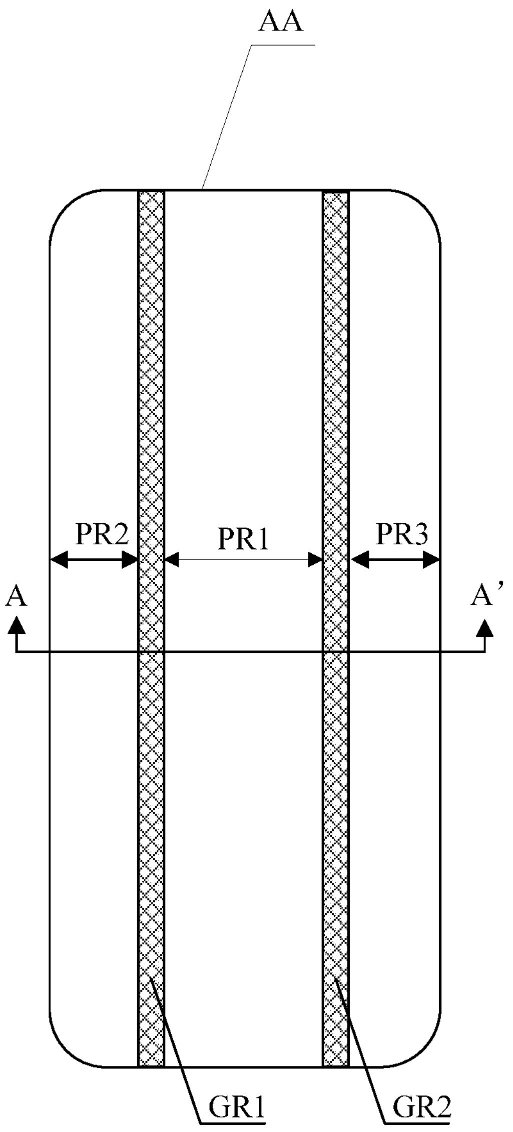
FIG. 7 is a first schematic diagram of a structure of a display substrate according to an exemplary embodiment.
Figure 8:
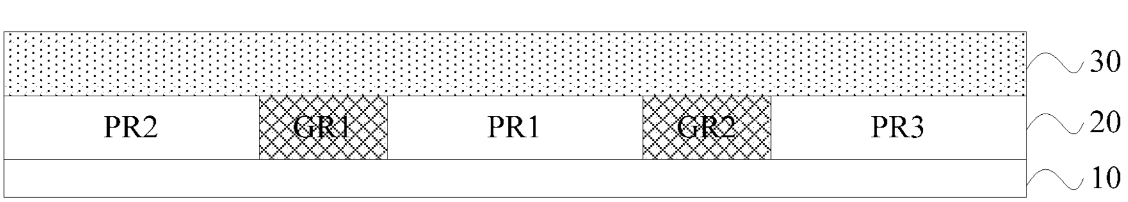
FIG. 8 is a sectional view along direction A-A' in FIG. 7.

FIG. 7 is a first schematic diagram of a structure of a display substrate according to an exemplary embodiment. FIG. 8 is a sectional view along direction A-A' in FIG. 7. As shown in FIG. 7 and FIG. 8, in an exemplary embodiment, the pixel circuit array includes: a second pixel circuit array PR2, a first pixel circuit array PR1 and a third pixel circuit array PR3 that are sequentially arranged in the row direction. The drive circuit array includes: a first drive circuit array GR1 and a second drive circuit array GR2 that are sequentially arranged in the row direction. The first drive circuit array GR1 is located between the first pixel circuit array PR1 and the second pixel circuit array PR2, and the second drive circuit array GR2 is located between the first pixel circuit array PR1 and the third pixel circuit array PR3.

In an exemplary embodiment, the first pixel circuit array may include: M rows and N1 columns of pixel circuits; the second pixel circuit array may include: M rows and N2 columns of pixel circuits; and the third pixel circuit array may include: M rows and N3 columns of pixel circuits, N1+N2+N3=N, where values of N1, N2 and N3 are determined according to actual requirements.

In an exemplary embodiment, multiple drive circuits in the first drive circuit array and the second drive circuit array may be linearly arranged.

In an exemplary embodiment, the first drive circuit array and the second drive circuit array may include: a scanning drive circuit and a light-emitting drive circuit; and the scanning drive circuit and the light-emitting drive circuit in a same drive circuit array are arranged in the row direction. Alternatively, the first drive circuit array includes: a scanning drive circuit, and the second drive circuit array includes: a light-emitting drive circuit. Alternatively, the first drive circuit array includes: a light-emitting drive circuit, and the second drive circuit array includes: a scanning drive circuit.

Figure 9:
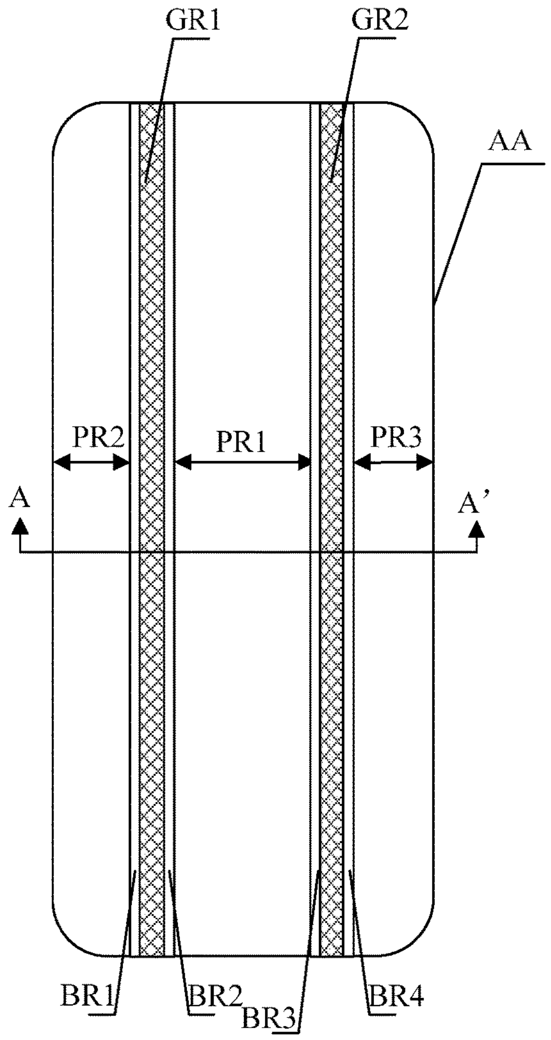
FIG. 9 is a second schematic diagram of a structure of a display substrate according to an exemplary embodiment.
Figure 10:
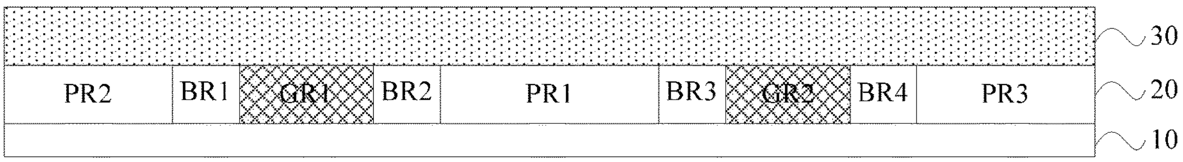
FIG. 10 is a sectional view along direction A-A' in FIG. 9.

FIG. 9 is a second schematic diagram of a structure of a display substrate according to an exemplary embodiment. FIG. 10 is a sectional view along direction A-A' in FIG. 9. As shown in FIG. 9 and FIG. 10, in an exemplary embodiment, when the drive structure layer further includes: a blank circuit array, the blank circuit array includes: a first blank circuit array BR1, a second blank circuit array BR2, a third blank circuit array BR3, and a fourth blank circuit array BR4. The first blank circuit array BR1 is located between the second pixel circuit array PR2 and the first drive circuit array GR1, the second blank circuit array BR2 is located between the first drive circuit array GR1 and the first pixel circuit array PR1, the third blank circuit array BR3 is located between the first pixel circuit array PR1 and the second drive circuit array GR2, and the fourth blank circuit array BR4 is located between the second drive circuit array GR2 and the third pixel circuit array PR3.

In an exemplary embodiment, multiple blank circuits of the first blank circuit array, the second blank circuit array, the third blank circuit array, and the fourth blank circuit array may be linearly arranged.

Figure 11:
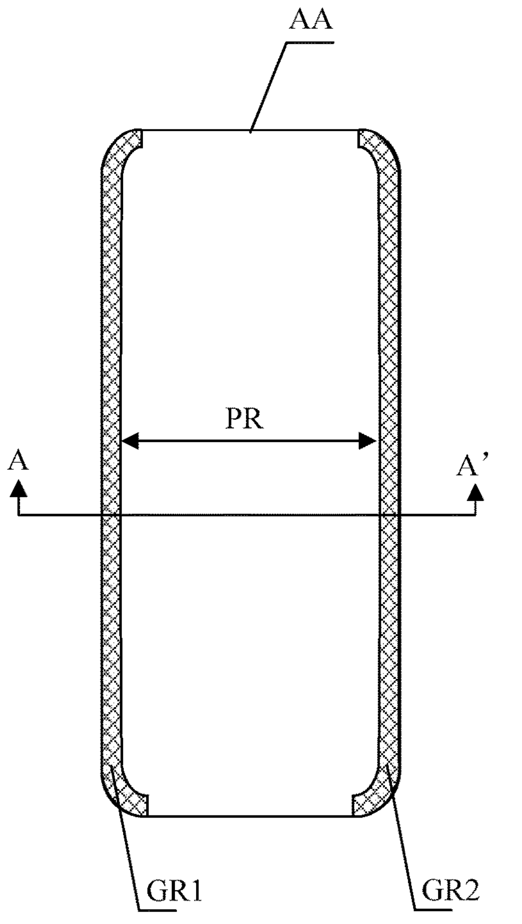
FIG. 11 is a third schematic diagram of a structure of a display substrate according to an exemplary embodiment.
Figure 12:
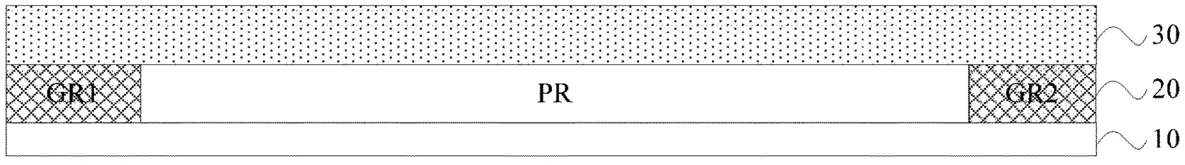
FIG. 12 is a sectional view along direction A-A' in FIG. 11.

FIG. 11 is a third schematic diagram of a structure of a display substrate according to an exemplary embodiment. FIG. 12 is a sectional view along direction A-A' in FIG. 11. As shown in FIG. 11 and FIG. 12, in an exemplary embodiment, the drive circuit array includes: a first drive circuit array GR1 and a second drive circuit array GR2 that are sequentially arranged in the row direction. The first drive circuit array GR1 is arranged at a side, close to the first boundary of the display region, of the pixel circuit array PR, and the second drive circuit array GR2 is arranged at a side, close to the second boundary of the display region, of the pixel circuit array PR.

In an exemplary embodiment, at least part of drive circuits, close to the arc display boundary, in the first drive circuit array are arranged in an arc shape.

In an exemplary embodiment, at least part of drive circuits, close to the arc display boundary, in the second drive circuit array are arranged in an arc shape.

In an exemplary embodiment, the first drive circuit array and the second drive circuit array may include: a scanning drive circuit and a light-emitting drive circuit; and the scanning drive circuit and the light-emitting drive circuit in a same drive circuit array are arranged in the row direction. Alternatively, the first drive circuit array includes: a scanning drive circuit, and the second drive circuit array includes: a light-emitting drive circuit. Alternatively, the first drive circuit array includes: a light-emitting drive circuit, and the second drive circuit array includes: a scanning drive circuit.

Figure 13:
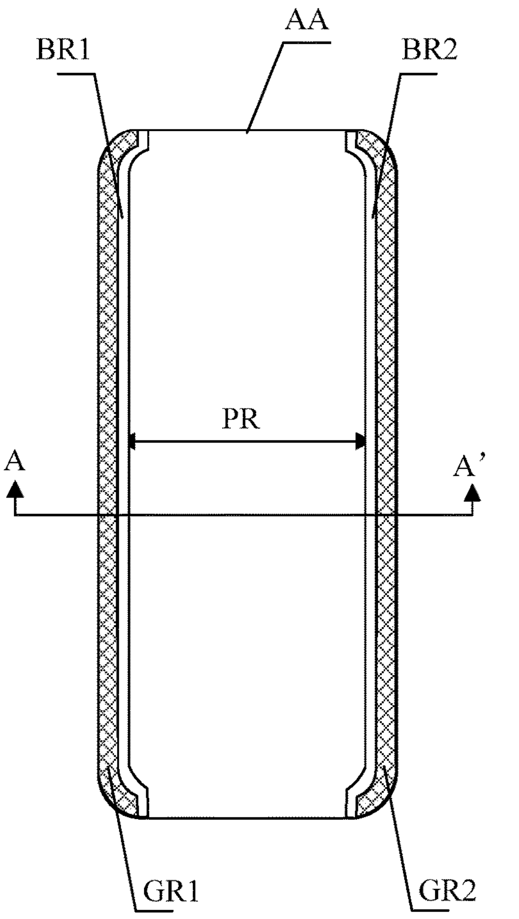
FIG. 13 is a fourth schematic diagram of a structure of a display substrate according to an exemplary embodiment.
Figure 14:
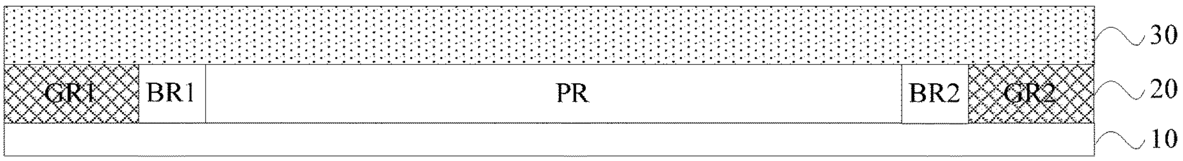
FIG. 14 is a sectional view along direction A-A' in FIG. 13.

FIG. 13 is a fourth schematic diagram of a structure of a display substrate according to an exemplary embodiment. FIG. 14 is a sectional view along direction A-A' in FIG. 13. As shown in FIG. 13 and FIG. 14, in an exemplary embodiment, when the drive structure layer further includes: a blank circuit array, the blank circuit array includes: a first blank circuit array BR1 and a second blank circuit array BR2. The first blank circuit array BR1 is located between the first drive circuit array GR1 and the pixel circuit array PR, and the second blank circuit array BR2 is located between the pixel circuit array PR and the second drive circuit array GR2.

In an exemplary embodiment, at least part of blank circuits, close to the arc display boundary, in the first blank circuit array are arranged in an arc shape.

In an exemplary embodiment, at least part of blank circuits, close to the arc display boundary, in the second blank circuit array are arranged in an arc shape.

Figure 15:
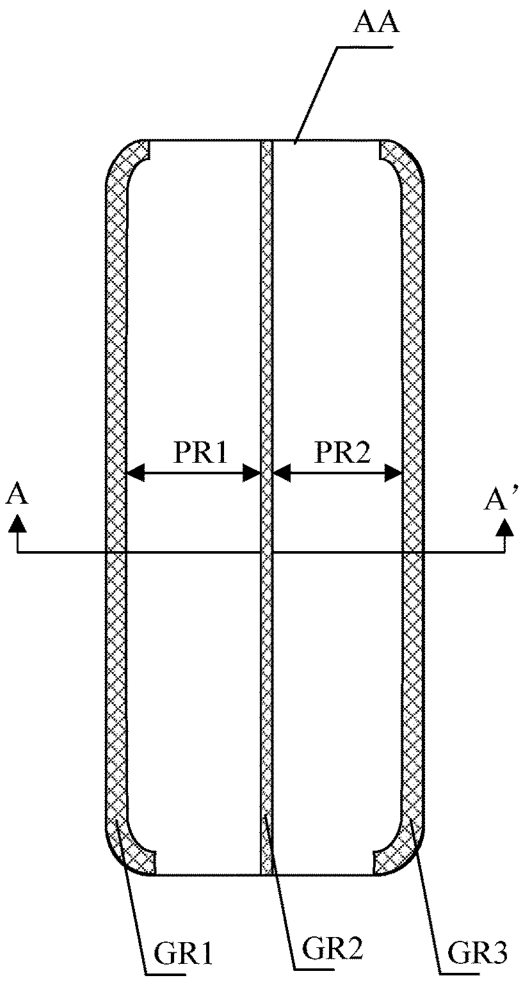
FIG. 15 is a fifth schematic diagram of a structure of a display substrate according to an exemplary embodiment.
Figure 16:
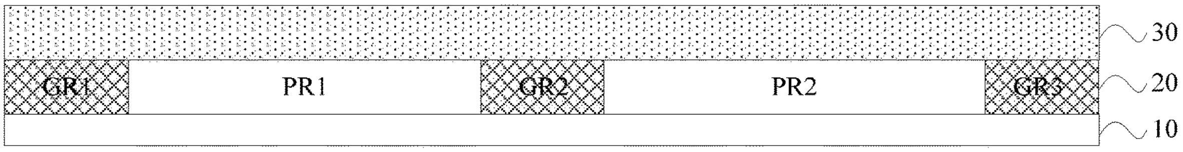
FIG. 16 is a sectional view along direction A-A' in FIG. 15.

FIG. 15 is a fifth schematic diagram of a structure of a display substrate according to an exemplary embodiment. FIG. 16 is a sectional view along direction A-A' in FIG. 15. As shown in FIG. 15 and FIG. 16, the pixel circuit array includes: a first pixel circuit array PR1 and a second pixel circuit array PR2 that are sequentially arranged in the row direction. The drive circuit array includes: a first drive circuit array GR1, a second drive circuit array GR2, and a third drive circuit array GR3 that are sequentially arranged in the row direction. The first pixel circuit array PR1 is located between the first drive circuit array GR1 and the second driving circuit array GR2, and the second pixel circuit array PR2 is located between the second drive circuit array GR2 and the third drive circuit array GR3.

In an exemplary embodiment, the first pixel circuit array include: M rows and N4 columns of pixel circuits; and the second pixel circuit array includes: M rows and N5 columns of pixel circuits, where N4+N5=N.

In an exemplary embodiment, at least part of drive circuits, close to the arc display boundary, in the first drive circuit array are arranged in an arc shape.

In an exemplary embodiment, at least part of drive circuits, close to the arc display boundary, in the third drive circuit array are arranged in an arc shape.

In an exemplary embodiment, multiple drive circuits in the second drive circuit array are linearly arranged.

In an exemplary embodiment, the first drive circuit array and the third drive circuit array may include: a scanning drive circuit, and the second drive circuit array may include: a light-emitting drive circuit. According to the present disclosure, the light-emitting drive circuit is arranged in the middle of the display and a single-side drive mode is adopted, which is conductive to narrowing left and right borders of the display product.

Figure 17:
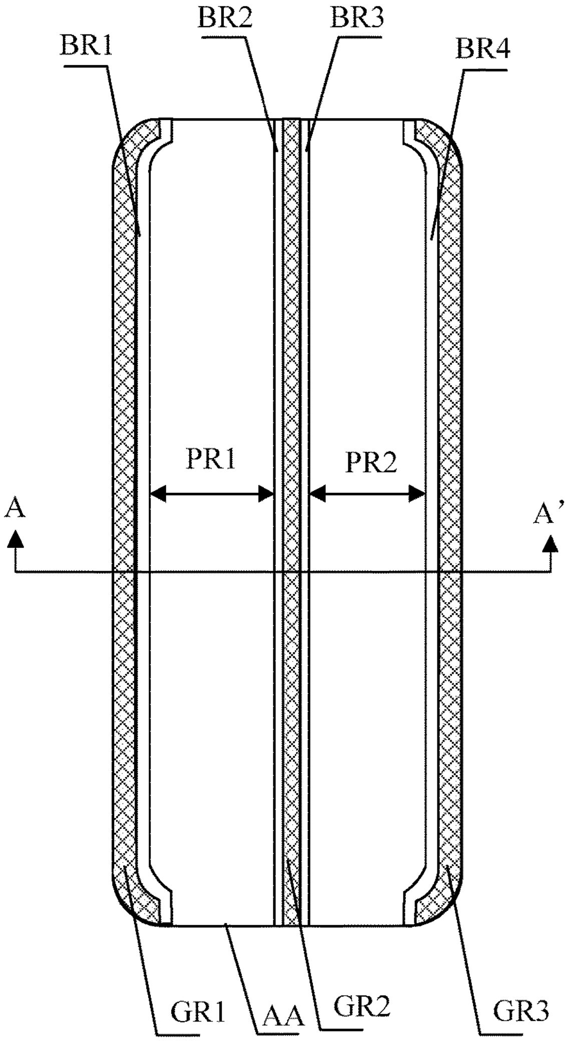
FIG. 17 is a sixth schematic diagram of a structure of a display substrate according to an exemplary embodiment.
Figure 18:
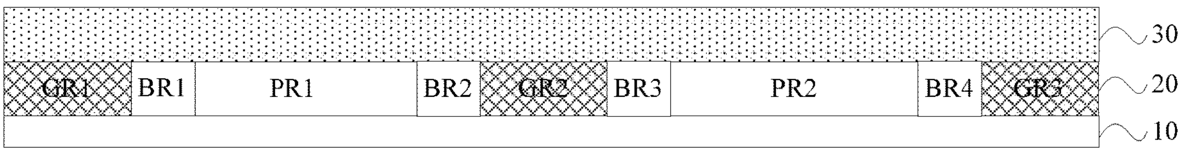
FIG. 18 is a sectional view along direction A-A' in FIG. 17.

FIG. 17 is a sixth schematic diagram of a structure of a display substrate according to an exemplary embodiment. FIG. 18 is a sectional view along direction A-A' in FIG. 17. As shown in FIG. 17 and FIG. 18, when the drive structure layer further includes: a blank circuit array, the blank circuit array includes: a first blank circuit array BR1, a second blank circuit array BR2, a third blank circuit array BR3, and a fourth blank circuit array BR4. The first blank circuit array BR1 is located between the first drive circuit array GR1 and the first pixel circuit array PR1; the second blank circuit array BR2 is located between the first pixel circuit array PR1 and the second drive circuit array GR2; the third blank circuit array BR3 is located between the second drive circuit array GR2 and the second pixel circuit array PR2; and the fourth blank circuit array BR4 is located between the second pixel circuit array PR2 and the third drive circuit array GR3.

In an exemplary embodiment, at least part of blank circuits, close to the arc display boundary, in the first blank circuit array are arranged in an arc shape.

In an exemplary embodiment, multiple drive circuits in the second blank circuit array are linearly arranged.

In an exemplary embodiment, multiple drive circuits in the third blank circuit array are linearly arranged.

In an exemplary embodiment, at least part of blank circuits, close to the arc display boundary, in the fourth blank circuit array are arranged in an arc shape.

In an exemplary embodiment, the display substrate may further include: a first power line, a second power line, a third power line, a fourth power line, a data signal line, a first scanning clock signal line, a second scanning clock signal line, a light-emitting clock signal line, a second light-emitting clock signal line, a scanning initial signal line, and a light-emitting initial signal line, which extend in the column direction, and a reset signal line and an initial signal line which extend in the row direction.

In an exemplary embodiment, the light-emitting structure is electrically connected to the second power line.

In an exemplary embodiment, the first power line and the third power line continuously provide a high-level signal, and the second power line and the third power line continuously provide a low-level signal.

In an exemplary embodiment, the pixel circuit may be of a 3T1C, 4T1C, 5T1C, 5T2C, 6T1C, or 7T1C structure.

Figure 19:
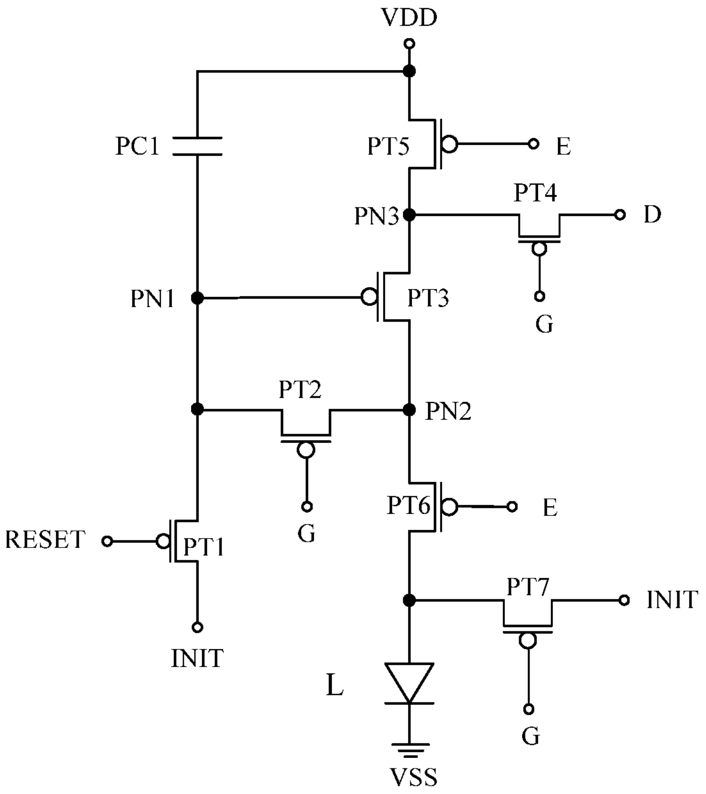
FIG. 19 is a diagram of an equivalent circuit of a pixel circuit according to an exemplary embodiment.

FIG. 19 is a diagram of an equivalent circuit of a pixel circuit according to an exemplary embodiment. As shown in FIG. 19, the pixel circuit according to an exemplary embodiment may include: a first pixel transistor PT1 to a seventh pixel transistor PT7, and a first pixel capacitor PC1. A control electrode of the first pixel transistor PT1 is electrically connected to a reset signal line RESET, a first electrode of the first pixel transistor PT1 is electrically connected to a first pixel node PN1, and a second electrode of the first pixel transistor PT1 is electrically connected to an initial signal line INIT. A control electrode of the second pixel transistor PT2 is electrically connected to a scanning signal line G, a first electrode of the second pixel transistor PT2 is electrically connected to the first pixel node PN1, and a second electrode of the pixel transistor PT2 is electrically connected to a second pixel node PN2. A control electrode of the third pixel transistor PT3 is electrically connected to the first pixel node PN1, a first electrode of the third pixel transistor PT3 is electrically connected to a third pixel node PN3, and a second electrode of the third pixel transistor PT3 is electrically connected to the second pixel node PN2. A control electrode of the fourth pixel transistor PT4 is electrically connected to a scanning signal line G, a first electrode of the fourth pixel transistor PT4 is electrically connected to a data signal line D, and a second electrode of the fourth pixel transistor PT4 is electrically connected to the third pixel node PN3. A control electrode of the fifth pixel transistor PT5 is electrically connected to a light-emitting signal line E, a first electrode of the fifth pixel transistor PT5 is electrically connected to a first power line VDD, and a second electrode of the fifth pixel transistor PT5 is electrically connected to the third pixel node PN3. A control electrode of the sixth pixel transistor PT6 is electrically connected to a light-emitting signal line E, a first electrode of the sixth pixel transistor PT6 is electrically connected to the second pixel node PN2, and a second electrode of the sixth pixel transistor PT6 is electrically connected to a light-emitting structure L. A control electrode of the seventh pixel transistor PT7 is electrically connected to a scanning signal line G, a first electrode of the seventh pixel transistor PT7 is electrically connected to an initial signal line INIT, and a second electrode of the seventh pixel transistor PT7 is electrically connected to the light-emitting structure L. A first plate PC11 of the first pixel capacitor PC1 is electrically connected to the first pixel node PN1, and a second plate PC12 of the first pixel capacitor PC1 is electrically connected to the first power line VDD.

In an exemplary embodiment, the first pixel transistor PT1, the second pixel transistor PT2, the fourth pixel transistor PT4 to the seventh pixel transistor PT7 may be switch transistors. The third pixel transistor PT3 may be a drive transistor.

In an exemplary embodiment, the first pixel transistor PT1 to the seventh pixel transistor PT7 may adopt low temperature poly-silicon thin film transistors, or may adopt oxide thin film transistors, or may adopt a low temperature poly-silicon thin film transistor(s) and an oxide thin film transistor(s). An active layer of the low temperature poly-silicon thin film transistor adopts Low Temperature Poly-Silicon (LTPS for short), and an active layer of the oxide thin film transistor adopts an Oxide. The low temperature poly-silicon thin film transistor has advantages such as high migration rate and fast charging, and the oxide thin film transistor has advantages such as low drain current. In an exemplary implementation mode, the low temperature poly-silicon thin film transistor and the oxide thin film transistor may be integrated on one display substrate to form a Low Temperature Polycrystalline Oxide (LTPO for short) display substrate, so that advantages of the two can be utilized, high Pixel Per Inch (PPI for short) and low-frequency drive can be realized, power consumption can be reduced, and display quality can be improved.

In an exemplary embodiment, the first pixel transistor PT1 to the seventh pixel transistor PT7 may be P-type transistors, or may be N-type transistors. Adopting the same type of transistors in the pixel circuit may simplify the process flow, reduce the process difficulty of the display substrate, and improve the yield of the product. In an exemplary embodiment, the first pixel transistor PT1 to the seventh pixel transistor PT7 may include a P-type transistor (s) and an N-type transistor(s).

Figure 20:
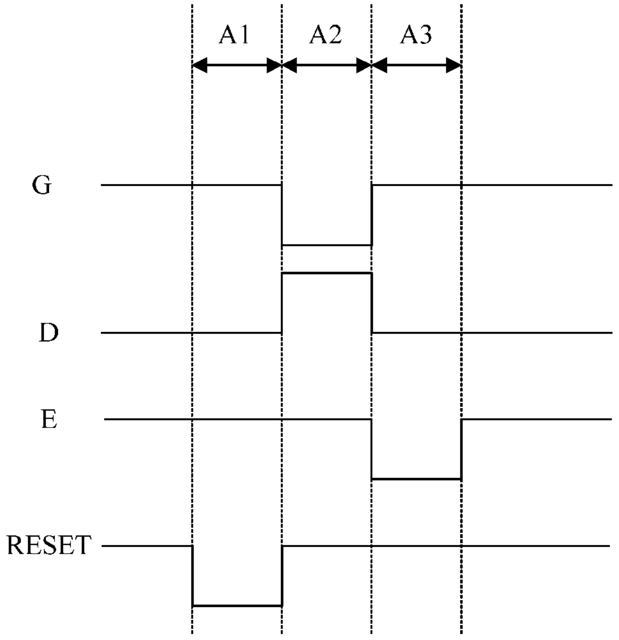
FIG. 20 is a diagram of a work timing sequence of the pixel circuit provided in FIG. 19.

FIG. 20 is a diagram of a work timing sequence of the pixel circuit provided in FIG. 19. By taking an example that the first pixel transistor PT1 to the seventh pixel transistor PT7 are P-type transistors, an exemplary embodiment of the present disclosure is described below through a working process of the pixel circuit illustrated in FIG. 19. The pixel circuit in FIG. 19 includes seven transistors (the first pixel transistor PT1 to the seventh pixel transistor PT7), a capacitor (PC1), and seven signal lines (the data signal line D, the scanning signal lines G, the light-emitting signal lines E, the initial signal line INIT, and the reset signal line RESET), and two power lines (the first power line VDD and the second power line VSS). The working process of the pixel circuit may include the following phases.

In a first phase A1, which is called a reset phase, a signal of the reset signal line RESET is a low-level signal, and signals of the scanning signal line G and the light-emitting signal line E are high-level signals. The signal of the reset signal line RESET is a low-level signal, so that the first pixel transistor PT1 is turned on, a signal of the initial signal line INIT is provided to the first pixel node PN1 to initialize the first pixel capacitor PC1 and clear an original data voltage in the first pixel capacitor PC1. The signals of the scanning signal line G and the light-emitting signal line E are high-level signals, so that the second pixel transistor PT2, the fourth pixel transistor PT4, the fifth pixel transistor PT5, the sixth pixel transistor PT6, and the seventh pixel transistor PT7 are turned off. The light-emitting structure L does not emit light in this phase.

In a second phase A2, which is called a data writing phase or a threshold compensation phase, the signal of the scanning signal line G is a low-level signal, the signals of the reset signal line RESET and the light-emitting signal line E are high-level signals, and the data signal line D outputs a data voltage. In this phase, as a second terminal of the first pixel capacitor PC1 is of a low level, the third pixel transistor PT3 is turned on. The signal of the scanning signal line G is a low-level signal such that the second pixel transistor PT2, the fourth pixel transistor PT4, and the seventh pixel transistor PT7 are turned on. The second pixel transistor PT2 and the fourth pixel transistor PT4 are turned on such that the data voltage output by the data signal line D is provided to the first pixel node PN1 through the third pixel node N3, the turned-on third pixel transistor PT3, the second pixel node PN2, and the turned-on second pixel transistor PT2, and the first pixel capacitor PC1 is charged with a difference between the data voltage output by the data signal line D and a threshold voltage of the third pixel transistor PT3. A voltage of the first pixel node PN1 is Vd−|Vth|, where Vd is the data voltage output by the data signal line D, and Vth is the threshold voltage of the third pixel transistor PT3. The seventh pixel transistor PT7 is turned on such that an initial voltage of the initial signal line INIT is provided to a first electrode of the light-emitting structure L to initialize (reset) the first electrode of the light-emitting structure L and clear its internal pre-stored voltage, thereby completing the initialization to ensure that the OLED does not emit light. The signal of the reset signal line RESET is a high-level signal such that the first transistor pixel PT1 is turned off. The signal of the light-emitting signal line E is a high-level signal such that the fifth pixel transistor PT5 and the sixth pixel transistor PT6 are turned off.

In a third phase A3, which is called a light-emitting phase, the signal of the light-emitting signal line E is a low-level signal, and the signals of the scanning signal line G and the reset signal line RESET are high-level signals. The signal of the light-emitting signal line E is a low-level signal, so that the fifth pixel transistor PT5 and the sixth pixel transistor PT6 are turned on, and a power voltage output by the first power line VDD provides a driving voltage for the first electrode of the light-emitting structure L through the fifth pixel transistor PT5, third pixel transistor PT3, and sixth pixel transistor PT6 that are turned on to drive the light-emitting structure L to emit light.

In a driving process of the pixel circuit, a drive current flowing through the third pixel transistor PT3 (a drive pixel transistor) is determined by a voltage difference between the control electrode and first electrode thereof. Since the voltage of the first pixel node PN1 is Vdata−|Vth|, the drive current of the third pixel transistor PT3 is:

$$I=K*(Vgs-Vth)^2=K*[(Vdd-Vd+|Vth|)-Vth]2=K*[(Vdd-Vd]^2$$

wherein I is the drive current flowing through the third pixel transistor PT3, i.e., the drive current for driving the light-emitting structure L, K is a constant, Vgs is the voltage difference between the control electrode and the first electrode of the third pixel transistor PT3, Vth is the threshold voltage of the third pixel transistor PT3, Vd is the data voltage output by the data signal line D, and Vdd is the power voltage output by the first power line VDD.

Figure 21:
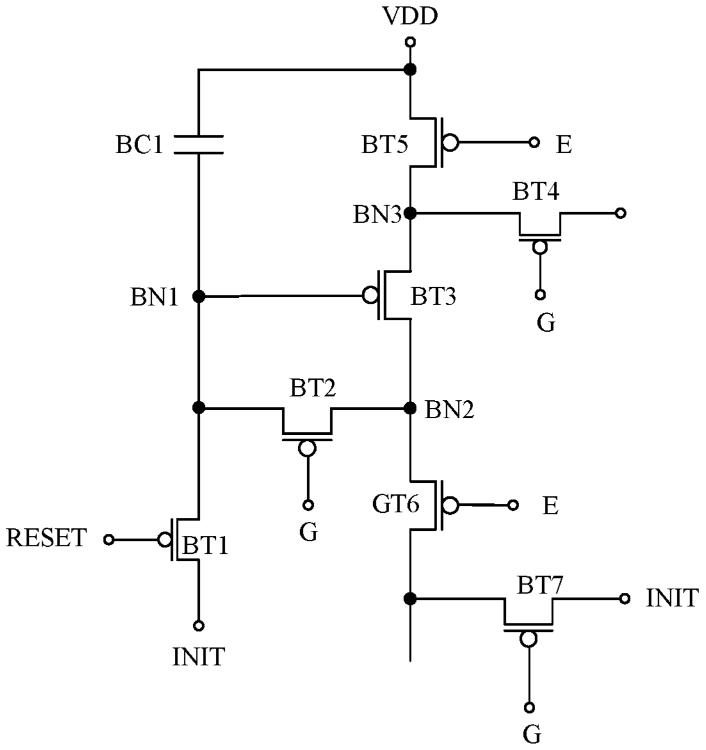
FIG. 21 is a schematic diagram of a structure of a blank circuit according to an exemplary embodiment.

FIG. 21 is a schematic diagram of a structure of a blank circuit according to an exemplary embodiment. As shown in FIG. 21, the blank circuit according to an exemplary embodiment includes: a first blank transistor BT1 to a seventh blank transistor BT7, and a first blank capacitor BC1. A control electrode of the first blank transistor BT1 is electrically connected to a reset signal line RESET, a first electrode of the first blank transistor BT1 is electrically connected to a first blank node BN1, and a second electrode of the first blank transistor BT1 is electrically connected to an initial signal line INIT. A control electrode of the second blank transistor BT2 is electrically connected to a scanning signal line G, a first electrode of the second blank transistor BT2 is electrically connected to the first blank node BN1, and a second electrode of the second blank transistor BT2 is electrically connected to a second blank node BN2. A control electrode of the third blank transistor BT3 is electrically connected to the first blank node BN1, a first electrode of the third blank transistor BT3 is electrically connected to a third blank node BN3, and a second electrode of the third blank transistor BT3 is electrically connected to the second blank node BN2. A control electrode of the fourth blank transistor BT4 is electrically connected to a scanning signal line G, a first electrode of the fourth blank transistor BT4 is floating, and a second electrode of the fourth blank transistor BT4 is electrically connected to the third blank node BN3. A control electrode of the fifth blank transistor BT5 is electrically connected to a light-emitting signal line E, a first electrode of the fifth blank transistor BT5 is electrically connected to a first power line VDD, and a second electrode of the fifth blank transistor BT5 is electrically connected to the third blank node BN3. A control electrode of the sixth blank transistor BT6 is electrically connected to a light-emitting signal line E, a first electrode of the sixth blank transistor BT6 is electrically connected to the second blank node BN2, and a second electrode of the sixth blank transistor BT6 is floating or electrically connected to the first power line. A control electrode of the seventh blank transistor BT7 is electrically connected to a scanning signal line G, a first electrode of the seventh blank transistor BT7 is electrically connected to an initial signal line INIT, and a second electrode of the seventh blank transistor BT7 is electrically connected to the second electrode of the sixth blank transistor BT6. A first plate BC11 of the first blank capacitor BC1 is electrically connected to the first blank node BN1, and a second plate BC12 of the first blank capacitor BC1 is electrically connected to the first power line VDD. FIG. 21 illustrates by taking an example that the second electrode of the sixth blank transistor BT6 is floating.

In an exemplary embodiment, the first blank transistor BT1 to the seventh blank transistor BT7 may be switch transistors. The first blank transistor BT1 to the seventh blank transistor BT7 may adopt low temperature poly-silicon thin film transistors, or may adopt oxide thin film transistors, or may adopt a low temperature poly-silicon thin film transistor(s) and an oxide thin film transistor(s). An active layer of the low temperature poly-silicon thin film transistor adopts Low Temperature Poly-Silicon (LTPS for short), and an active layer of the oxide thin film transistor adopts an Oxide. The low temperature poly-silicon thin film transistor has advantages such as high migration rate and fast charging, and the oxide thin film transistor has advantages such as low drain current. In an exemplary implementation mode, the low temperature poly-silicon thin film transistor and the oxide thin film transistor may be integrated on one display substrate to form a Low Temperature Polycrystalline Oxide (LTPO for short) display substrate, so that advantages of the two can be utilized, high Pixel Per Inch (PPI for short) and low-frequency drive can be realized, power consumption can be reduced, and display quality can be improved.

Figure 22:
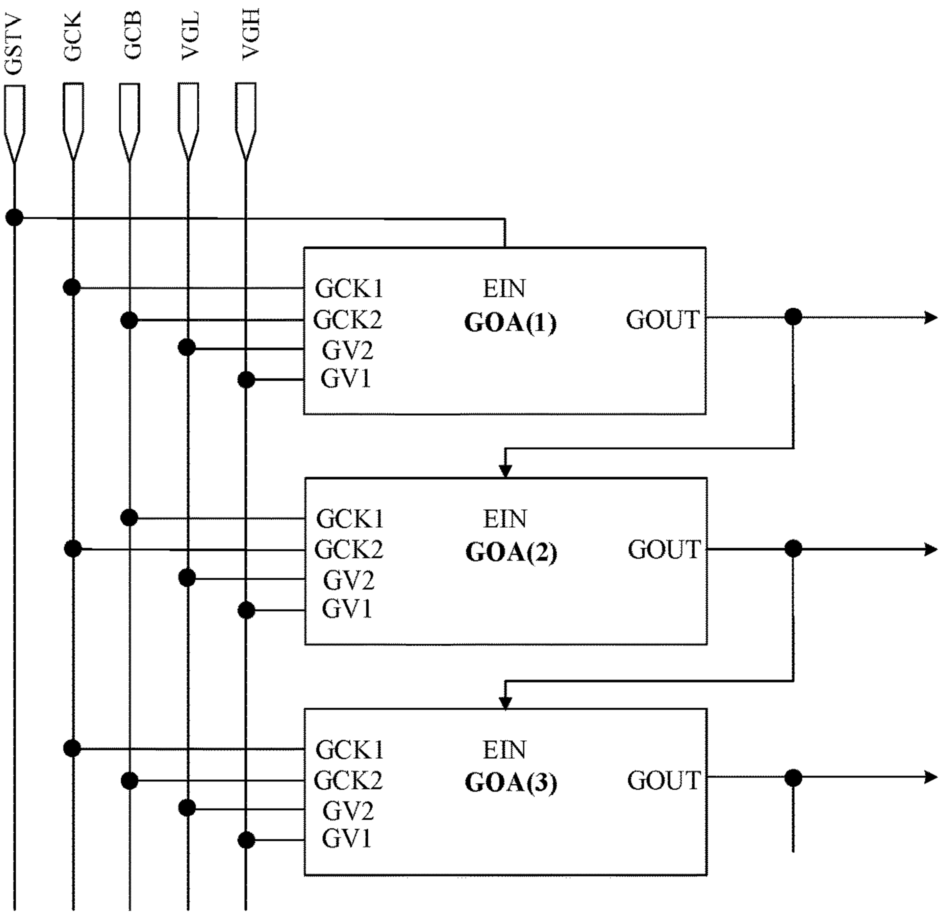
FIG. 22 is a schematic diagram of a structure of a scanning drive circuit according to an exemplary embodiment.
Figure 23:
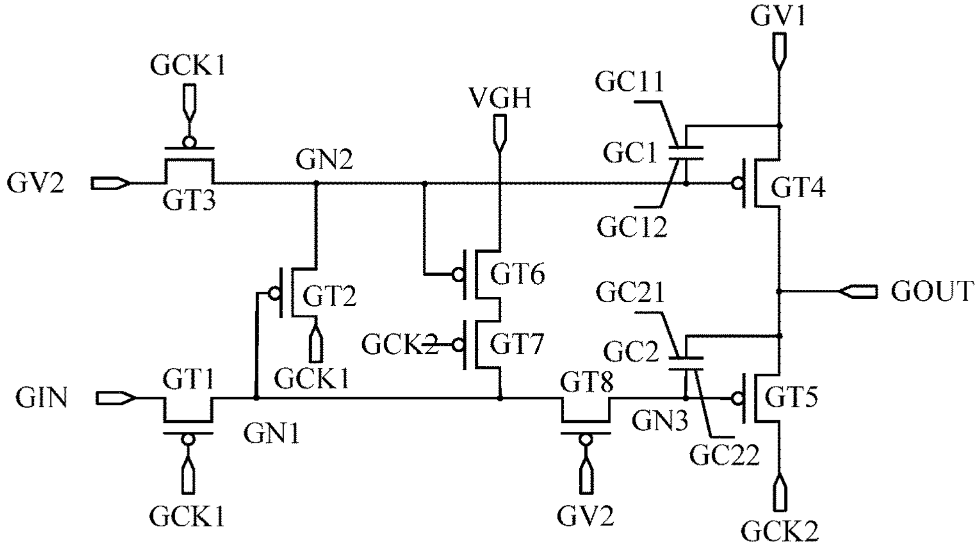
FIG. 23 is a diagram of an equivalent circuit of a first shift register according to an exemplary embodiment.
Figure 24:
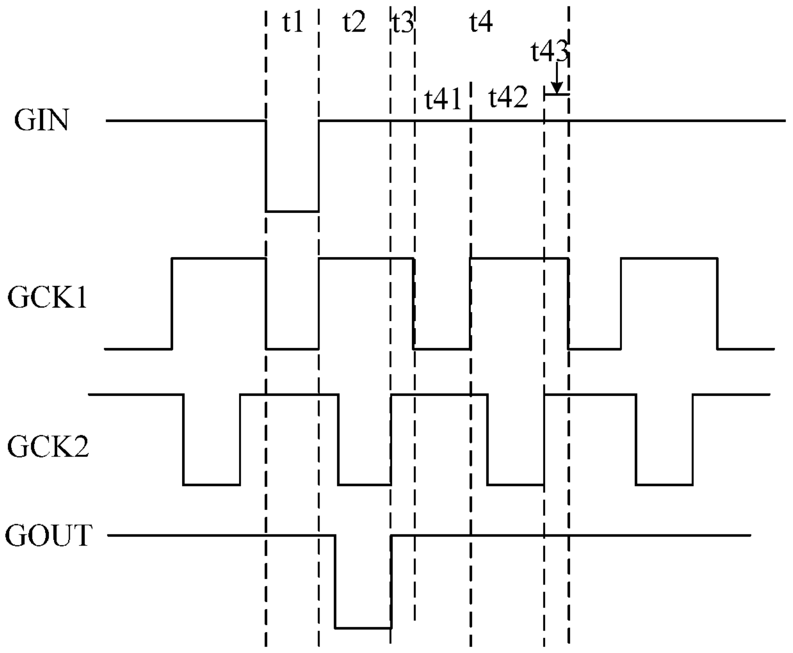
FIG. 24 is a diagram of a work timing sequence of a first shift register according to an exemplary embodiment.

FIG. 22 is a schematic diagram of a structure of a scanning drive circuit according to an exemplary embodiment. FIG. 23 is a diagram of an equivalent circuit of a first shift register according to an exemplary embodiment. FIG. 24 is a diagram of a work timing sequence of a first shift register according to an exemplary embodiment. As shown in FIG. 22 to FIG. 24, the scanning drive circuit according to an exemplary embodiment may include: multiple cascaded first shift registers GOA that are sequentially arranged in the column direction. Each first shift resister GOA includes: a first scan transistor GT1 to an eighth scan transistor GT8, a first scanning capacitor GC1, a second scanning capacitor GC2, a scanning signal input terminal GIN, a scanning signal output terminal GOUT, a first scanning clock signal terminal GCK1, a second scanning clock signal terminal GCK2, a first scanning power terminal GV1, and a second scanning power terminal GV2.

A control electrode of the first scan transistor GT1 is electrically connected to the first scanning clock signal terminal GCK1, a first electrode of the first scan transistor GT1 is electrically connected to the scanning signal input terminal GIN, and a second electrode of the first scan transistor GT1 is electrically connected to a first scan node GN1. A control electrode of the second scan transistor GT2 is electrically connected to the first scan node GN1, a first electrode of the second scan transistor GT2 is electrically connected to the first scanning clock signal terminal GCK1, and a second electrode of the second scan transistor GT2 is electrically connected to a second scan node GN2. A control electrode of the third scan transistor GT3 is electrically connected to the first scanning clock signal terminal GCK1, a first electrode of the third scan transistor GT3 is electrically connected to the second scanning power terminal GV2, and a second electrode of the third scan transistor GT3 is electrically connected to the second scan node GN2. A control electrode of the fourth scan transistor GT4 is electrically connected to the second scan node GN2, a first electrode of the fourth scan transistor GT4 is electrically connected to the first scanning power terminal, and a second electrode of the fourth scan transistor GT4 is electrically connected to the scanning signal output terminal GOUT. A control electrode of the fifth scan transistor GT5 is electrically connected to a third scan node GN3, a first electrode of the fifth scan transistor GT5 is electrically connected to the scanning signal output terminal GOUT, and a second electrode of the fifth scan transistor GT5 is electrically connected to the second scanning clock signal terminal GCK2. A control electrode of the sixth scan transistor GT6 is electrically connected to the second scan node GN2, a first electrode of the sixth scan transistor GT6 is electrically connected to the first scanning power terminal GV1, and a second electrode of the sixth scan transistor GT6 is electrically connected to a first electrode of the seventh scan transistor GT7. A control electrode of the seventh scan transistor GT7 is electrically connected to the second scanning clock signal terminal GCK2, and a second electrode of the seventh scan transistor GT7 is electrically connected to the first scan node GN1. A control electrode of the eighth scan transistor GT8 is electrically connected to the second scanning power terminal GV2, a first electrode of the eighth scan transistor GT8 is electrically connected to the first scan node GN1, and a second electrode of the eighth scan transistor GT8 is electrically connected to the third scan node GN3. A first plate GC11 of the first scanning capacitor GC1 is electrically connected to the first scanning power terminal GV1, and a second plate GC12 of the first scanning capacitor GC1 is electrically connected to the second scan node GN2. A first plate GC21 of the second scanning capacitor GC2 is electrically connected to the scanning signal output terminal GOUT, and a second plate GC22 of the second scanning capacitor GC2 is electrically connected to the third scan node GN3.

A scanning signal input terminal GIN of a first-stage first shift register GOA(1) is electrically connected to a scanning initial signal line GSTV, a scanning signal output terminal GOUT of an $(i-1)^{th}$-stage first shift register GOA(i−1) is electrically connected to a scanning signal input terminal GIN of an $i^{th}$-stage first shift register GOA(i), first scanning power terminals GV1 of all the first shift registers are electrically connected to a third power line VGH, second scanning power terminals GV2 of the first shift registers are electrically connected to a fourth power line VGL, a first scanning clock signal terminal GCK1 of an odd-stage first shift register is electrically connected to a first scanning clock signal line GCK, a second scanning clock signal terminal GCK2 of the odd-stage first shift register is electrically connected to a second scanning clock signal line GCB, a first scanning clock signal terminal GCK1 of an even-stage first shift register is electrically connected to the second scanning clock signal line GCB, a second scanning clock signal terminal GCK2 of the even-stage first shift register is electrically connected to the first scanning clock signal line GCK, and scanning signal output terminals of the first shift registers are electrically connected to scanning signal lines, where i is a positive integer greater than or equal to 2.

In an exemplary embodiment, the first scan transistor GT1 to the eighth scan transistor GT8 may be switch transistors. The first scan transistor GT1 to the eighth scan transistor GT8 may adopt low temperature poly-silicon thin film transistors, or may adopt oxide thin film transistors, or may adopt a low temperature poly-silicon thin film transistor(s) and an oxide thin film transistor(s). An active layer of the low temperature poly-silicon thin film transistor adopts Low Temperature Poly-Silicon (LTPS for short), and an active layer of the oxide thin film transistor adopts an Oxide. The low temperature poly-silicon thin film transistor has advantages such as high migration rate and fast charging, and the oxide thin film transistor has advantages such as low drain current. In an exemplary implementation mode, the low temperature poly-silicon thin film transistor and the oxide thin film transistor may be integrated on one display substrate to form a Low Temperature Polycrystalline Oxide (LTPO for short) display substrate, so that advantages of the two can be utilized, high Pixel Per Inch (PPI for short) and low-frequency drive can be realized, power consumption can be reduced, and display quality can be improved.

In an exemplary embodiment, the number of the first shift registers may be M.

Taking an example that the first scan transistor GT1 to the eighth scan transistor GT8 are P-type transistors, an exemplary embodiment of the present disclosure is described below through a working process of the first shift register illustrated in FIG. 23 in conjunction with FIG. 24. The working process of the first shift register may include the following phases.

In an input phase t1, a signal of the first scanning clock signal terminal GCK1 is a low-level signal, a signal of the second scanning clock signal terminal GCK2 is a high-level signal, and a signal of the scanning signal input terminal GIN is a low-level signal. As the signal of the first scanning clock signal terminal GCK1 is a low-level signal, the first scan transistor GT1 is turned on, and the signal of the scanning signal input terminal GIN is transmitted to the first scan node GN1 through the first scan transistor GT1. As a signal of the eighth scan transistor GT8 receives a low-level signal of the second scanning power terminal GV2, the eighth scan transistor GT8 is in an ON state. A level signal of the third scan node GN3 can control the fifth scan transistor GT5 to be turned on, and a signal of the second scanning clock signal terminal GCK2 is transmitted to the scanning signal output terminal GOUT through the fifth scan transistor GT5, that is, in the input phase t1, the scanning signal output terminal GOUT is a high-level signal of the second scanning clock signal terminal GCK2. In addition, as the signal of the first scanning clock signal terminal GCK1 is a low-level signal, the third scan transistor GT3 is turned on, and the low-level signal of the second scanning power terminal GV2 is transmitted to the second scan node GN2 via the third scan transistor GT3. At this point, both the fourth scan transistor GT4 and the sixth scan transistor GT6 are turned on. As the signal of the second scanning clock signal terminal GCK2 is a high-level signal, the seventh scan transistor GT7 is turned off.

In an output phase t2, the signal of the first scanning clock signal terminal GCK1 is a high-level signal, the signal of the second scanning clock signal terminal GCK2 is a low-level signal, and the signal of the scanning signal input terminal GIN is a high-level signal. The fifth scan transistor GT5 is turned on, and the signal of the second scanning clock signal terminal GCK2 is used as the signal of the scanning signal output terminal GOUT via the fifth scan transistor GT5. In the output phase t2, a level signal at a terminal, connected to the scanning signal output terminal GOUT, of the second scanning capacitor GC2 becomes a signal of the second scanning power terminal GV2. Due to a bootstrap effect of the second scanning capacitor GC2, the eighth scan transistor GT8 is turned off, the fifth scan transistor GT5 can be turned on better, and the signal of the signal output terminal OUT is a low-level signal. In addition, the signal of the first scanning clock signal terminal GCK1 is a high-level signal, so that both the first scan transistor GT1 and the third scan transistor GT3 are turned off. The second scan transistor GT2 is turned on, and the high-level signal of the first scanning clock signal terminal GCK1 is transmitted to the second scan node GN2 via the second scan transistor GT2, so that both the fourth scan transistor GT4 and the sixth scan transistor GT6 are turned off. As the signal of the second scanning clock signal terminal GCK2 is a low-level signal, the seventh scan transistor GT7 is turned on.

In a buffering phase t3, the signals of the first scanning clock signal terminal GCK1 and the second scanning clock signal terminal GCK2 are both high-level signals, the signal of the scanning signal input terminal GIN is a high-level signal, the fifth scan transistor GT5 is turned on, and the signal of the second scanning clock signal terminal GCK2 is used as the signal of the scanning signal output terminal GOUT via the fifth scan transistor GT5. At this point, the scanning signal output terminal GOUT is a high-level signal. Due to the bootstrap effect of the second scanning capacitor GC2, the level signal of the first scan node GN1 becomes VGL-VthN1. In addition, the signal of the first scanning clock signal terminal GCK1 is a high-level signal, so that the first scan transistor GT1 and the third scan transistor GT3 are both turned off, the eighth scan transistor GT8 is turned on, the second scan transistor GT2 is turned on, and the high-level signal of the first scanning clock signal terminal GCK1 is transmitted to the second scan node GN2 via the second scan transistor GT2, and thus both the fourth scan transistor GT4 and the sixth scan transistor GT6 are turned off. As the signal of the second scanning clock signal terminal GCK2 is a high-level signal, the seventh scan transistor GT7 is turned off.

In a first sub-stage t41 of a stabilization phase t4, the signal of the first scanning clock signal terminal GCK1 is a low-level signal, a signal of a second clock signal CB is a high-level signal, and the signal of the scanning signal input terminal GIN is a high-level signal. As the signal of the first scanning clock signal terminal GCK1 is a low-level signal, the first scan transistor GT1 is turned on, the signal of the scanning signal input terminal GIN is transmitted to the first scan node GN1 through the first scan transistor GT1, and the second scan transistor GT2 is turned off. As the eighth scan transistor GT8 is in an ON state, the fifth scan transistor GT5 is turned off. As the signal of the first scanning clock signal terminal GCK1 is a low-level signal, the third scan transistor GT3 is turned on, the fourth scan transistor GT4 and the sixth scan transistor GT6 are both turned on, and the high-level signal of the first scanning power terminal GV1 is transmitted to the scanning signal output terminal GOUT through the fourth scan transistor GT4, that is, the gate output signal is a high-level signal.

In a second sub-stage t42 of the stabilization phase t4, the signal of the first scanning clock signal terminal GCK1 is a high-level signal, the signal of the second clock signal CB is a low-level signal, and the signal of the scanning signal input terminal GIN is a high-level signal. Both the fifth scan transistor GT5 and the second scan transistor GT2 are turned off. The signal of the first scanning clock signal terminal GCK1 is a high-level signal, so that the first scan transistor GT1 and the third scan transistor GT3 are both turned off. Under a holding effect of the first scanning capacitor C1, the fourth scan transistor GT4 and the sixth scan transistor GT6 are both turned on, and the high-level signal is transmitted to the scanning signal output terminal GOUT through the fourth scan transistor GT4, that is, the gate output signal is a high-level signal.

In the second sub-phase t42, as the signal of the second scanning clock signal terminal GCK2 is a low-level signal, the seventh scan transistor GT7 is turned on, so that the high-level signal is transmitted to the third scan node GN3 and the first scan node GN1 through the sixth scan transistor GT6 and the seventh scan transistor GT7, and thus the signals of the third scan node GN3 and the first scan node GN1 are kept as high-level signals.

In a third sub-phase t43, the signals of the first scanning clock signal terminal GCK1 and the second scanning clock signal terminal GCK2 are both high-level signals, and the signal of the scanning signal input terminal GIN is a high-level signal. The fifth scan transistor GT5 and the second scan transistor GT2 are turned off. The signal of the first scan clock signal terminal GCK1 is a high-level signal, so that the first scan transistor GT1 and the third scan transistor GT3 are both turned off, and the fourth scan transistor GT4 and the sixth scan transistor GT6 are both turned on. The high-level signal is transmitted through the fourth scan transistor GT4 to the scanning signal output terminal GOUT, that is, the gate output signal is a high-level signal.

Figure 25:
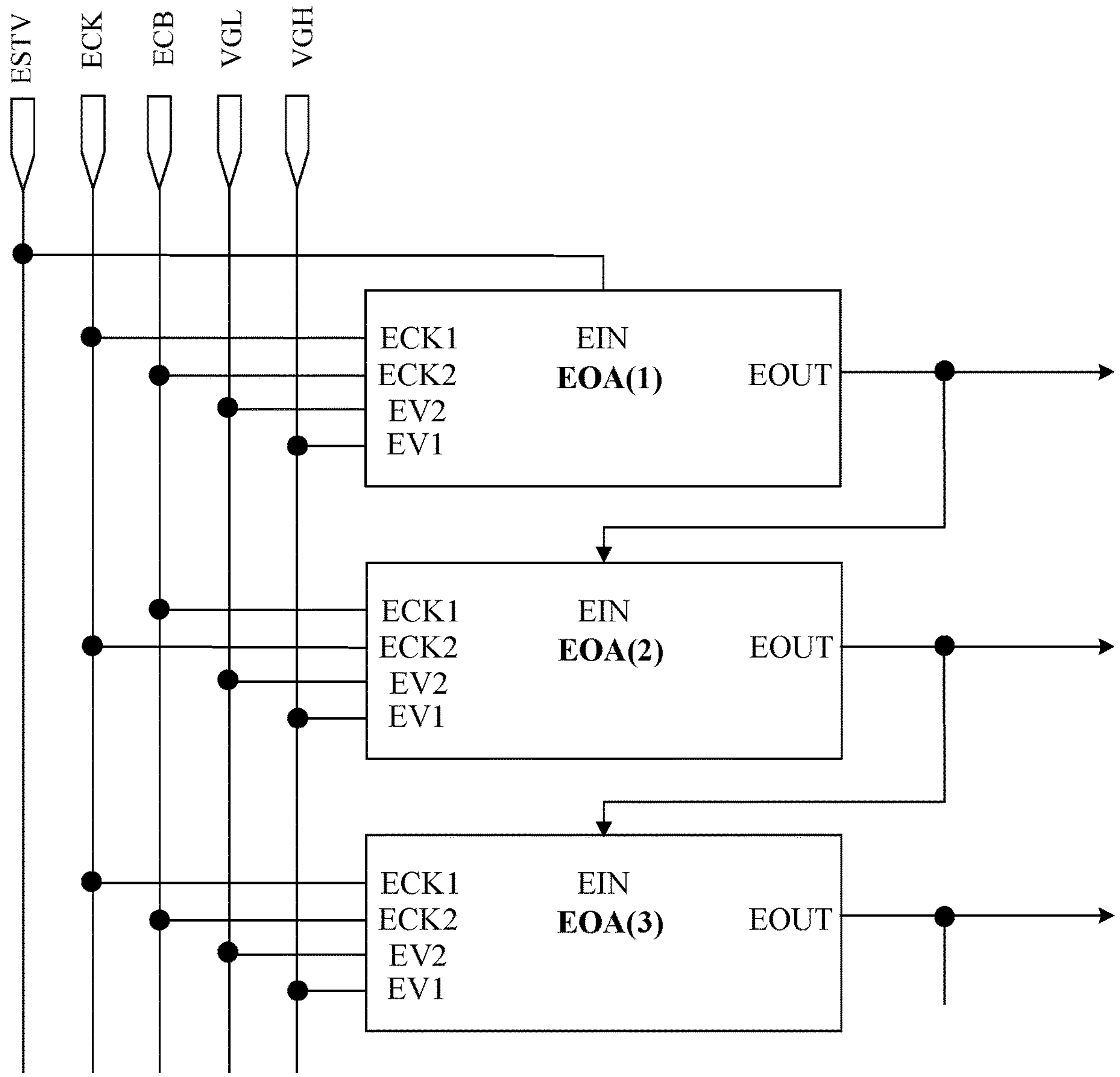
FIG. 25 is a schematic diagram of a structure of a light-emitting drive circuit according to an exemplary embodiment.
Figure 26:
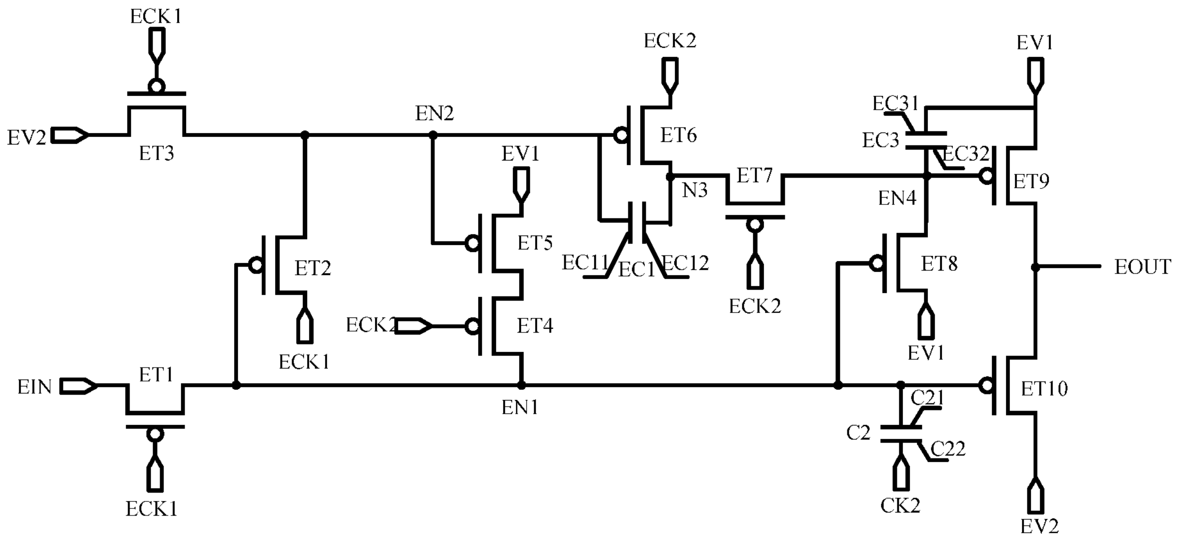
FIG. 26 is a diagram of an equivalent circuit of a second shift register according to an exemplary embodiment.
Figure 27:
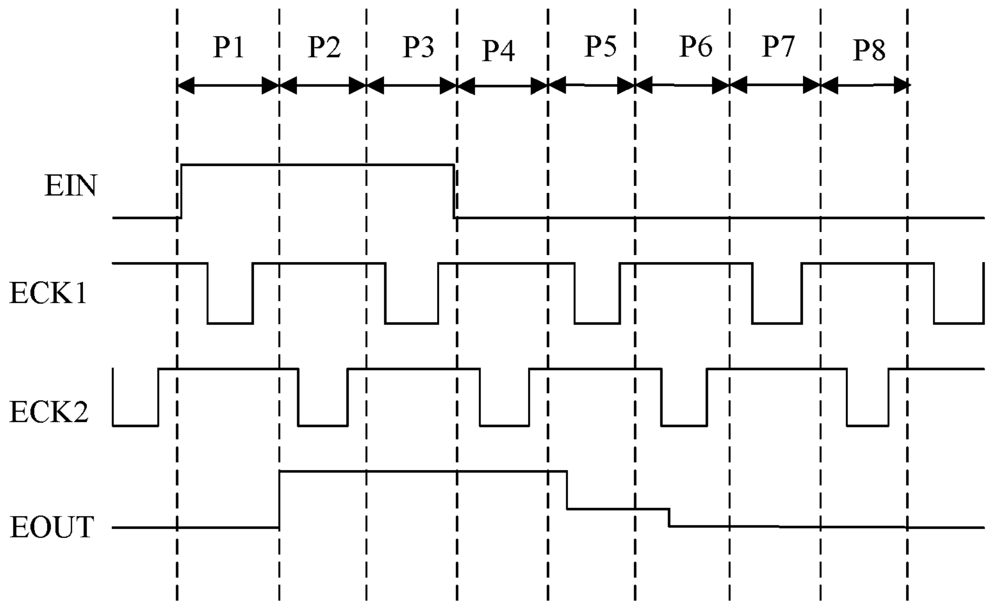
FIG. 27 is a diagram of a work timing sequence of a second shift register according to an exemplary embodiment.

FIG. 25 is a schematic diagram of a structure of a light-emitting drive circuit according to an exemplary embodiment. FIG. 26 is a diagram of an equivalent circuit of a second shift register according to an exemplary embodiment. FIG. 27 is a diagram of a work timing sequence of a second shift register according to an exemplary embodiment. As shown in FIG. 25 to FIG. 27, the light-emitting drive circuit according to an exemplary embodiment includes: multiple cascaded second shift registers EOA that are sequentially arranged in the column direction; and each second shift register includes: a first light-emitting transistor ET1 to a tenth light-emitting transistor ET10, a first light-emitting capacitor EC1 to a third light-emitting capacitor EC3, a light-emitting signal input terminal EIN, a light-emitting signal output terminal EOUT, a first light-emitting clock signal terminal ECK1, a second light-emitting clock signal terminal ECK2, a first light-emitting power terminal EV1, and a second light-emitting power terminal EV2.

A control electrode of the first light-emitting transistor ET1 is electrically connected to the first light-emitting clock signal terminal ECK1, a first electrode of the first light-emitting transistor ET1 is electrically connected to the light-emitting signal input terminal EIN, and a second electrode of the first light-emitting transistor ET1 is electrically connected to a first light-emitting node EN1. A control electrode of the second light-emitting transistor ET2 is electrically connected to the first light-emitting node EN1, a first electrode of the second light-emitting transistor ET2 is electrically connected to the first light-emitting clock signal terminal ECK1, and a second electrode of the second light-emitting transistor ET2 is electrically connected to a second light-emitting node EN2. A control electrode of the third light-emitting transistor ET3 is electrically connected to the first light-emitting clock signal terminal ECK1, a first electrode of the third light-emitting transistor ET3 is electrically connected to the second light-emitting power terminal EV2, and a second electrode of the third light-emitting transistor ET3 is electrically connected to the second light-emitting node EN2. A control electrode of the fourth light-emitting transistor ET4 is electrically connected to the second light-emitting clock signal terminal ECK2, a first electrode of the fourth light-emitting transistor ET4 is electrically connected to the first light-emitting node EN1, and a second electrode of the fourth light-emitting transistor ET4 is electrically connected to a first electrode of the fifth light-emitting transistor ET5. A control electrode of the fifth light-emitting transistor ET5 is electrically connected to the second light-emitting node EN2, and a second electrode of the fifth light-emitting transistor ET5 is electrically connected to the first light-emitting power terminal EV1. A control electrode of the sixth light-emitting transistor ET6 is electrically connected to the second light-emitting node EN2, a first electrode of the sixth light-emitting transistor ET6 is electrically connected to the second light-emitting clock signal terminal ECK2, and a second electrode of the sixth light-emitting transistor ET6 is electrically connected to a third light-emitting node EN3. A control electrode of the seventh light-emitting transistor ET7 is electrically connected to the second light-emitting clock signal terminal ECK2, a first electrode of the seventh light-emitting transistor ET7 is electrically connected to the third light-emitting node EN3, and a second electrode of the seventh light-emitting transistor ET7 is electrically connected to a fourth light-emitting node EN4. A control electrode of the eighth light-emitting transistor ET8 is electrically connected to the first light-emitting node EN1, a first electrode of the eighth light-emitting transistor ET8 is electrically connected to the first light-emitting power terminal EV1, and a second electrode of the eighth light-emitting transistor ET8 is electrically connected to the fourth light-emitting node EN4. A control electrode of the ninth light-emitting transistor ET9 is electrically connected to the fourth light-emitting node EN4, a first electrode of the ninth light-emitting transistor ET9 is electrically connected to the light-emitting signal output terminal EOUT, and a second electrode of the ninth light-emitting transistor ET9 is electrically connected to the first light-emitting power terminal EV1. A control electrode of the tenth light-emitting transistor ET10 is electrically connected to the first light-emitting node EN1, a first electrode of the tenth light-emitting transistor ET10 is electrically connected to the second light-emitting power terminal EV2, and a second electrode of the tenth light-emitting transistor ET10 is electrically connected to the light-emitting signal output terminal EOUT. A first plate EC11 of the first light-emitting capacitor EC1 is electrically connected to the second light-emitting node EN2, and a second plate EC12 of the first light-emitting capacitor EC1 is electrically connected to the third light-emitting node EN3; a first plate EC21 of the second light-emitting capacitor EC2 is electrically connected to the first light-emitting node EN1, and a second plate EC22 of the second light-emitting capacitor EC2 is electrically connected to the second light-emitting clock signal terminal ECK2; and a first plate EC31 of the third light-emitting capacitor EC3 is electrically connected to the fourth light-emitting node EN4, and a second plate EC32 of the third light-emitting capacitor EC3 is electrically connected to the first light-emitting power terminal EV1.

A light-emitting signal input terminal EIN of a first-stage second shift register EOA(1) is electrically connected to a light-emitting initial signal line ESTV, a light-emitting signal output terminal EOUT of an $(i-1)^{th}$-stage second shift register EOA(i−1) is electrically connected to a light-emitting signal input terminal EIN of an $i^{th}$-stage second shift register EOA(i), first light-emitting power terminals EV1 of all the second shift registers are electrically connected to a third power line VGH, second light-emitting power terminals EV2 of the second shift registers are electrically connected to a fourth power line VGL, a first light-emitting clock signal terminal ECK1 of an odd-stage second shift register is electrically connected to a first light-emitting clock signal line GCK, a second light-emitting clock signal terminal ECK2 of the odd-stage second shift register is electrically connected to a second light-emitting clock signal line GCB, a first light-emitting clock signal terminal of an even-stage second shift register ECK1 is electrically connected to the second light-emitting clock signal line GCB, a second light-emitting clock signal terminal ECK2 of the even-stage second shift register is electrically connected to the first light-emitting clock signal line GCK, and light-emitting signal output terminals EOUT of the second shift registers are electrically connected to light-emitting signal lines E, where i is a positive integer greater than or equal to 2.

In an exemplary embodiment, the number of the second shift registers may be M, or M/2.

In an exemplary embodiment, the first light-emitting transistor ET1 to the tenth light-emitting transistor ET10 may be switch transistors. The first light-emitting transistor ET1 to the tenth light-emitting transistor ET10 may adopt low temperature poly-silicon thin film transistors, or may adopt oxide thin film transistors, or may adopt a low temperature poly-silicon thin film transistor(s) and an oxide thin film transistor(s). An active layer of the low temperature poly-silicon thin film transistor adopts Low Temperature Poly-Silicon (LTPS for short), and an active layer of the oxide thin film transistor adopts an Oxide. The low temperature poly-silicon thin film transistor has advantages such as high migration rate and fast charging, and the oxide thin film transistor has advantages such as low drain current. In an exemplary implementation mode, the low temperature poly-silicon thin film transistor and the oxide thin film transistor may be integrated on one display substrate to form a Low Temperature Polycrystalline Oxide (LTPO for short) display substrate, so that advantages of the two can be utilized, high Pixel Per Inch (PPI for short) and low-frequency drive can be realized, power consumption can be reduced, and display quality can be improved.

Taking an example that the first light-emitting transistor ET1 to the tenth light-emitting transistor ET10 are P-type transistors, an exemplary embodiment of the present disclosure is described below through the working process of a second shift register illustrated in FIG. 27 in conjunction with FIG. 26. The working process of the second shift register may include the following phases.

In a first phase P1, the signal of the light-emitting signal input terminal EIN is a high-level signal, and the signal of the first light-emitting clock signal terminal ECK1 is a low-level signal, the first light-emitting transistor ET1 and the third light-emitting transistor ET3 are turned on, and the signal of the light-emitting signal input terminal EIN is written into the first light-emitting node EN1; at this point, the first light-emitting node EN1 is of a high level, and the signal of the second power terminal EV2 is written into the second light-emitting node EN2; and at this point, the second light-emitting node EN2 is of a low level. As the first light-emitting node EN1 is of a high level, the second light-emitting transistor ET2, the eighth light-emitting transistor ET8 and the tenth light-emitting transistor ET10 are turned off. The signal of the second light-emitting clock signal terminal ECK2 is a high-level signal, and the fourth light-emitting transistor ET4 and the seventh light-emitting transistor ET7 are turned off. As the second light-emitting node EN2 is of a low level, the fifth light-emitting transistor ET5 and the sixth light-emitting transistor ET6 are turned on, and the signal of the second light-emitting clock signal terminal ECK2 is written into the third light-emitting node EN3. As the voltage across the capacitor will not change abruptly, the fourth light-emitting node EN4 remains at a high level of a previous frame, the ninth light-emitting transistor ET9 is turned off, and the output signal of the light-emitting signal output terminal EOUT remains at a low level of the previous frame.

In a second phase P2, the signal of the light-emitting signal input terminal EIN and the signal of the first light-emitting clock signal terminal ECK1 are high-level signals, and the first light-emitting transistor ET1 and the third light-emitting transistor ET3 are turned off; the first light-emitting node EN1 remains at a high level, and the second light-emitting transistor ET2, the eighth light-emitting transistor ET8 and the tenth light-emitting transistor ET10 are turned off; the second light-emitting node EN2 remains at a low level, and the fifth light-emitting transistor ET5 and the sixth light-emitting transistor ET6 are turned on; as the signal of the second light-emitting clock signal terminal ECK2 is a low-level signal, the fourth light-emitting transistor ET4 and the seventh light-emitting transistor ET7 are turned on, the signal of the second light-emitting clock signal terminal ECK2 is written into the third light-emitting node EN3, and the third light-emitting node EN3 changes to a low level from a high level; the signal of the third light-emitting node EN3 is written into the fourth light-emitting node EN4, and the fourth light-emitting node EN4 is of a low level; the ninth light-emitting transistor ET9 is turned on, and the light-emitting signal output terminal EOUT outputs a high-level signal of the first power terminal EV1.

In a third phase P3, the signal of the light-emitting signal input terminal EIN is a high-level signal, the signal of the first light-emitting clock signal terminal ECK1 is a low-level signal, and the first light-emitting transistor ET1 and the third light-emitting transistor ET3 are turned on; the first light-emitting node EN1 is of a high level, and the second light-emitting transistor ET2, the eighth light-emitting transistor ET8 and the tenth light-emitting transistor ET10 are turned off; the second light-emitting node EN2 remains at a low level, the fifth light-emitting transistor ET5 and the sixth light-emitting transistor ET6 are turned on, and the signal of the second light-emitting clock signal terminal ECK2 is written into the third light-emitting node EN3. Since the signal of the second light-emitting clock signal terminal ECK2 is a high-level signal, the third light-emitting node EN3 changes from a low level of the previous phase to a high level, and the fourth light-emitting transistor ET4 and the seventh light-emitting transistor ET7 are turned off; the fourth light-emitting node EN4 remains at a low level, the ninth light-emitting transistor ET9 is turned on, and the light-emitting signal output terminal EOUT outputs a high-level signal of the first power terminal EV1.

In a fourth phase P4, the signal of the light-emitting signal input terminal EIN is a low-level signal, the signal of the first light-emitting clock signal terminal ECK1 is a high-level signal, and the first light-emitting transistor ET1 and the third light-emitting transistor ET3 are turned off; the first light-emitting node EN1 remains at a high level, and the second light-emitting transistor ET2, the eighth light-emitting transistor ET8 and the tenth light-emitting transistor ET10 are turned off; the second light-emitting node EN2 remains at a low level, the fifth light-emitting transistor ET5 and the sixth light-emitting transistor ET6 are turned on, and the signal of the second light-emitting clock signal terminal ECK2 is written into the third light-emitting node EN3. Since the signal of the second light-emitting clock signal terminal ECK2 is a low-level signal, the third light-emitting node EN3 changes from a high level of the previous phase to a low level, the fourth light-emitting transistor ET4 and the seventh light-emitting transistor ET7 are turned on, and the signal of the third light-emitting node EN3 is written into the fourth light-emitting node EN4; the fourth light-emitting node EN4 remains at a low level, the ninth light-emitting transistor ET9 is turned on, and the light-emitting signal output terminal EOUT outputs a high level signal of the first power terminal EV1.

In a fifth phase P5, the signal of the light-emitting signal input terminal EIN and the signal of the first light-emitting clock signal terminal ECK1 are low-level signals, and the first light-emitting transistor ET1 and the third light-emitting transistor ET3 are turned on; the first light-emitting node EN1 changes to a low level from a high level, and the second light-emitting transistor ET2, the eighth light-emitting transistor ET8 and the tenth light-emitting transistor ET10 are turned on; the second light-emitting node EN2 remains at a low level, the fifth light-emitting transistor ET5 and the sixth light-emitting transistor ET6 are turned on, and the signal of the second light-emitting clock signal terminal ECK2 is written into the third light-emitting node EN3. Since the signal of the second light-emitting clock signal terminal ECK2 is a high-level signal, the third light-emitting node EN3 changes from a low level of the previous phase to a high level, and the fourth light-emitting transistor ET4 and the seventh light-emitting transistor ET7 are turned off. Since the eighth light-emitting transistor ET8 is turned on, the high-level signal of the first power terminal EV1 is written into the fourth light-emitting node EN4, the fourth light-emitting node EN4 changes to a high level, and the ninth light-emitting transistor ET9 is turned off. Since the tenth light-emitting transistor ET10 is turned on, the low-level signal of the second power terminal EV2 is written into the light-emitting signal output terminal EOUT, and the light-emitting signal output terminal EOUT outputs a low-level signal.

In a sixth phase P6, the signal of the light-emitting signal input terminal EIN is a low-level signal, the signal of the first light-emitting clock signal terminal ECK1 is a high-level signal, and the first light-emitting transistor ET1 and the third light-emitting transistor ET3 are turned off; the first light-emitting node EN1 remains at a low level, and the second light-emitting transistor ET2, the eighth light-emitting transistor ET8 and the tenth light-emitting transistor ET10 are turned on; the signal of the first light-emitting node EN1 is written into the second light-emitting node EN2, the second light-emitting node EN2 changes to a high level from a low level, the fifth light-emitting transistor ET5 and the sixth light-emitting transistor ET6 are turned off, and the third light-emitting node EN3 remains at a high level. Since the signal of the second light-emitting clock signal terminal ECK2 is a low-level signal, the fourth light-emitting transistor ET4 and the seventh light-emitting transistor ET7 are turned on, the signal of the third light-emitting node EN3 is written into the fourth light-emitting node EN4, the fourth light-emitting node EN4 remains at a high level, and the ninth light-emitting transistor ET9 is turned off. Since the tenth light-emitting transistor ET10 is turned on, the low-level signal of the second power terminal EV2 is written into the light-emitting signal output terminal EOUT, and the light-emitting signal output terminal EOUT outputs a low-level signal.

In a seventh phase P7, the signal of the light-emitting signal input terminal EIN is a low-level signal, the signal of the first light-emitting clock signal terminal ECK1 is a low-level signal, and the first light-emitting transistor ET1 and the third light-emitting transistor ET3 are turned on; the first light-emitting node EN1 remains at a low level, and the second light-emitting transistor ET2, the eighth light-emitting transistor ET8 and the tenth light-emitting transistor ET10 are turned on; the signal of the first light-emitting node EN1 is written into the second light-emitting node EN2, the second light-emitting node EN2 is of a low level, the fifth light-emitting transistor ET5 and the sixth light-emitting transistor ET6 are turned on, and the signal of the second light-emitting clock signal terminal ECK2 is written into the third light-emitting node EN3. Since the signal of the second light-emitting clock signal terminal ECK2 is a high-level signal, the fourth light-emitting transistor ET4 and the seventh light-emitting transistor ET7 are turned off; the fourth light-emitting node EN4 remains at a high level, and the ninth light-emitting transistor ET9 is turned off. Since the tenth light-emitting transistor ET10 is turned on, the low-level signal of the second power terminal EV2 is written into the light-emitting signal output terminal EOUT, and the light-emitting signal output terminal EOUT outputs a low-level signal.

In an eighth phase P8, the signal of the light-emitting signal input terminal EIN is a low-level signal, the signal of the first light-emitting clock signal terminal ECK1 is a high-level signal, and the first light-emitting transistor ET1 and the third light-emitting transistor ET3 are turned off; the first light-emitting node EN1 remains at a low level, and the second light-emitting transistor ET2, the eighth light-emitting transistor ET8 and the tenth light-emitting transistor ET10 are turned on; the signal of the first light-emitting node EN1 is written into the second light-emitting node EN2, the second light-emitting node EN2 changes to a high level from a low level, the fifth light-emitting transistor ET5 and the sixth light-emitting transistor ET6 are turned off, and the third light-emitting node EN3 remains at a high level. Since the signal of the second light-emitting clock signal terminal ECK2 is a low-level signal, the fourth light-emitting transistor ET4 and the seventh light-emitting transistor ET7 are turned on, the signal of the third light-emitting node EN3 is written into the fourth light-emitting node EN4, the fourth light-emitting node EN4 remains at a high level, and the ninth light-emitting transistor ET9 is turned off. Since the tenth light-emitting transistor ET10 is turned on, the low-level signal of the second power terminal EV2 is written into the light-emitting signal output terminal EOUT, and the light-emitting signal output terminal EOUT outputs a low-level signal.

After the seventh phase P7, the seventh phase P7 and the eighth phase P8 are circulated, the eighth light-emitting transistor ET8 is continuously turned on, the ninth light-emitting transistor ET9 is turned off, and the first light-emitting transistor ET1 periodically charges the second capacitor C2; the first light-emitting node EN1 remains at a low level, the tenth light-emitting transistor ET10 is continuously turned on, and the light-emitting signal output terminal EOUT outputs a low-level signal, until a pulse of the light-emitting signal input terminal EIN of a next frame enters.

Figure 28:
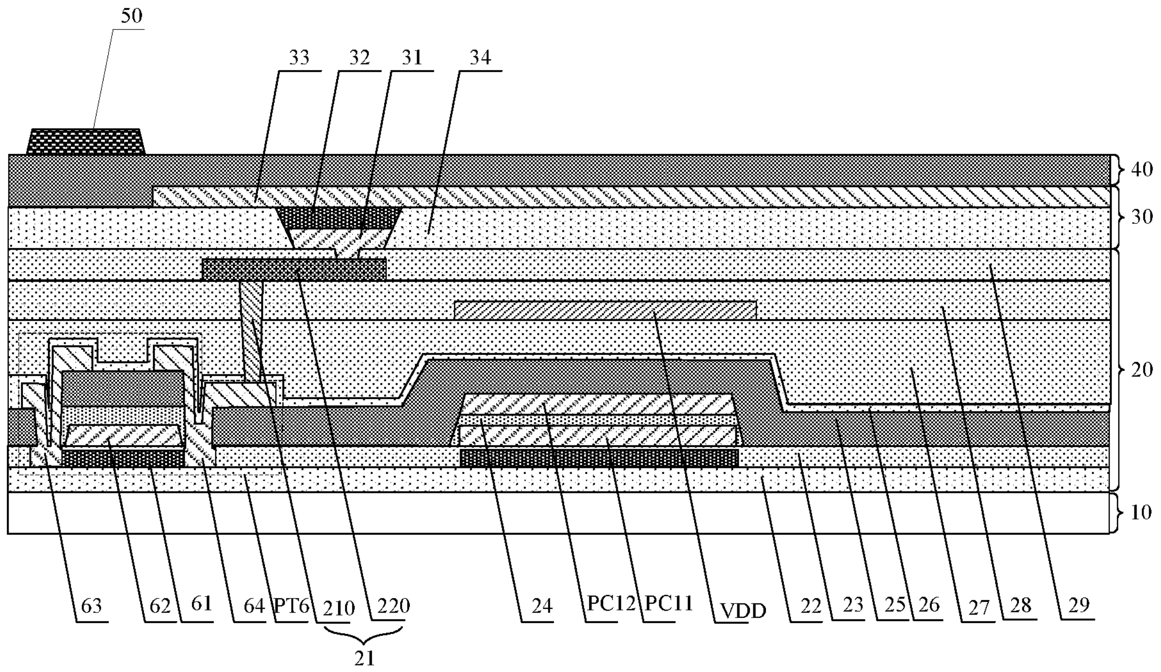
FIG. 28 is a first sectional view of a display substrate according to an exemplary embodiment.
Figure 29:
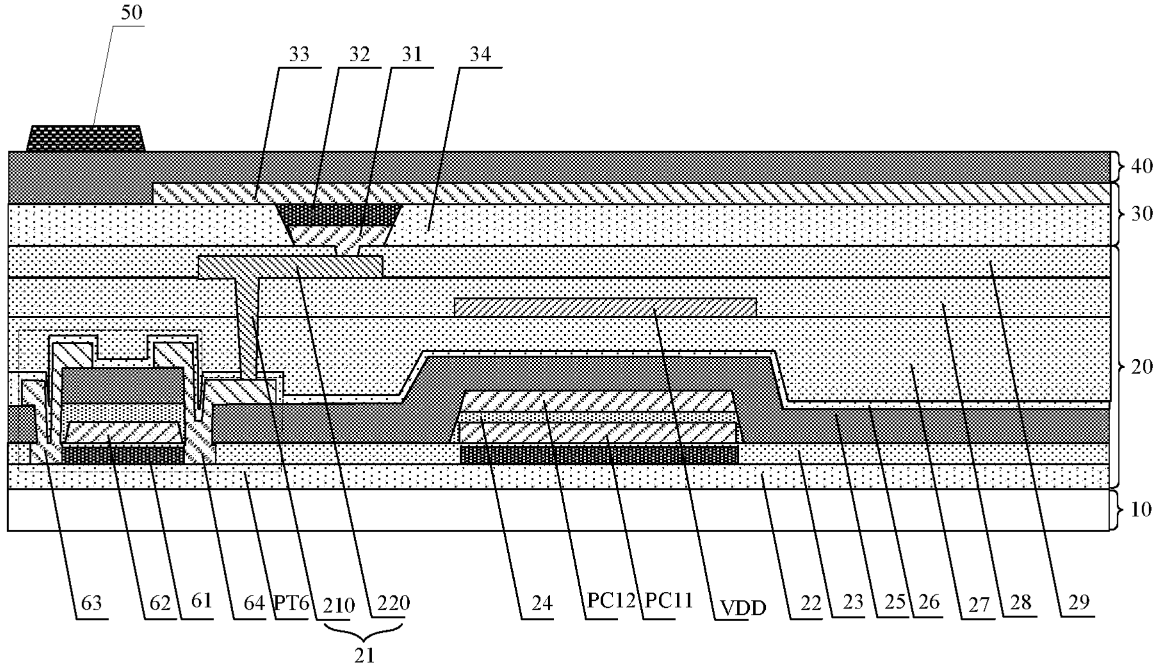
FIG. 29 is a second sectional view of a display substrate according to an exemplary embodiment.

FIG. 28 is a first sectional view of a display substrate according to an exemplary embodiment. FIG. 29 is a second sectional view of a display substrate according to an exemplary embodiment. As shown in FIG. 28 and FIG. 29, a light-emitting structure 30 includes: a first electrode layer, a pixel defining layer 34, a light-emitting layer, and a second electrode layer that are sequentially stacked on a drive structure layer 20. The first electrode layer includes: multiple first electrodes 31, the light-emitting layer includes: multiple organic light-emitting layers 32, the second electrode layer includes: multiple second electrodes 33, and each light-emitting structure includes: a first electrode, an organic light-emitting layer, and a second electrode.

In an exemplary embodiment, the organic light-emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary implementation mode, the hole injection layers of all sub-pixels may be connected together as a common layer; the electron injection layers of all sub-pixels may be connected together as a common layer; the hole transport layers of all sub-pixels may be connected together as a common layer; the electron transport layers of all sub-pixels may be connected together as a common layer; and the hole block layers of all sub-pixels may be connected together as a common layer. The light-emitting layers of adjacent sub-pixels may have a little overlap, or may be isolated from each other; and the electron block layers of adjacent sub-pixels may have a little overlap, or may be isolated from each other.

As shown in FIG. 28 and FIG. 29, the sixth pixel transistor PT6 may include: an active layer 61, a control electrode 62, a first electrode 63 and a second electrode 64. For each pixel circuit, there is no overlap between an orthographic projection of the second electrode 64 of the sixth pixel transistor PT6 on a substrate 10 and an orthographic projection of the first electrode 31 in the light-emitting structure connected to the pixel circuit on the substrate 10, that is, the pixel circuit and the light-emitting structure are in staggered arrangement.

In an exemplary embodiment, the pixel defining layer may adopt an organic material such as polyimide, acrylic, or polyethylene terephthalate.

In an exemplary embodiment, the first electrode layer may adopt a transparent conductive material such as indium tin oxide (ITO) or indium zinc oxide (IZO).

In an exemplary embodiment, the second electrode layer may adopt any one or more of magnesium (Mg), silver (Ag), aluminum (Al), copper (Cu), and lithium (Li), or an alloy made of any one or more of the above metals.

In an exemplary embodiment, as shown in FIG. 28 and FIG. 29, the drive structure layer 20 includes: a connection electrode 21. The connection electrode 21 is located between the pixel circuit and the light-emitting structure, and is electrically connected to the second electrode 64 of the sixth pixel transistor in the pixel circuit and the first electrode 31 in the light-emitting structure.

In an exemplary embodiment, the connection electrode 21 includes: a first connecting portion 210 and a second connecting portion 220. The first connecting portion is arranged on a side, close to the substrate 10, of the second connecting portion 220, the first connecting portion 210 is electrically connected to the second electrode 64 of the sixth pixel transistor in the pixel circuit and the second connecting portion 220, respectively, and the second connecting portion 220 is electrically connected to the first electrode 31 in the light-emitting structure.

In an exemplary embodiment, as shown in FIG. 28, the first connecting portion may be a metal electrode, and the second connecting portion may be a transparent electrode. In the embodiment, the first connecting portion is a metal electrode, and the second connecting portion is a transparent electrode, so that the connection electrode is not easily to be seen, which can ensure a display effect of the display substrate.

In an exemplary embodiment, as shown in FIG. 29, the first connecting portion and the second connecting portion may be of an integrated structure. In the embodiment, the first connecting portion and the second connecting portion are of an integrated structure, which can simplify a preparation process of the display substrate and save the preparation cost of the display substrate.

In an exemplary embodiment, as shown in FIG. 28 and FIG. 29, the display substrate may further include: an encapsulation layer 40 and a spacer 50. The encapsulation layer 40 is arranged on a side, away from the substrate 10, of the light-emitting structure layer 30, and the spacer 50 is arranged on a side, away from the substrate 10, of the encapsulation layer 40.

In an exemplary embodiment, the encapsulation layer may adopt a stacked structure of an inorganic material/an organic material/an inorganic material, and an organic material layer is arranged between two inorganic material layers.

In an exemplary embodiment, as shown in FIG. 28, when the first connecting portion is a metal electrode and the second connecting portion is a transparent electrode, the drive structure layer may further include: a first insulating layer 22, a semiconductor layer, a second insulating layer 23, a first metal layer, a third insulating layer 24, a second metal layer, a fourth insulating layer 25, a third metal layer, a fifth insulating layer 26, a first planarization layer 27, a fourth metal layer, a second planarization layer 28, a fifth metal layer, a transparent conductive layer, and a third planarization layer 29, which are sequentially stacked on the substrate.

In an exemplary embodiment, the semiconductor layer includes: active layers of multiple pixel transistors, active layers of multiple blank transistors, active layers of multiple scan transistors, and active layers of multiple light-emitting transistors; the first metal layer includes: a light-emitting signal line, a scanning signal line, a reset signal line, a first plate PC11 of a first pixel capacitor, a second plate of a first scanning capacitor, a second plate of a second scanning capacitor, a first plate of the a light-emitting capacitor, a first plate of a second light-emitting capacitor, a second plate of a third light-emitting capacitor, control electrodes of the multiple pixel transistors, control electrodes of the multiple blank transistors, control electrodes of the multiple scan transistors, and control electrodes of the multiple light-emitting transistors; the second metal layer includes: an initial signal line, a second plate PC12 of the first pixel capacitor, a first plate of the first scanning capacitor, a first plate of the second scanning capacitor, a second plate of the first light-emitting capacitor, a second plate of the second light-emitting capacitor, and a first plate of the third light-emitting capacitor; the third metal layer includes: a third power line, a fourth power line, a first scanning clock signal line, a second scanning clock signal line, a first light-emitting clock signal line, a second light-emitting clock signal line, a scanning initial signal line, a light-emitting initial signal line, first and second electrodes of the multiple pixel transistors, first and second electrodes of the multiple blank transistors, first and second electrodes of the multiple scan transistors, and first and second electrodes of the multiple light-emitting transistors; the fourth metal layer includes: a data signal line and a first power line VDD; the fifth metal layer includes: the first connecting portion 210, and the transparent conductive layer includes: the second connecting portion 220.

In an exemplary embodiment, as shown in FIG. 29, when the first connecting portion and the second connecting portion are of an integrated structure, the drive structure layer 20 further includes: a first insulating layer 22, a semiconductor layer, a second insulating layer 23, a first metal layer, a third insulating layer 24, a second metal layer, a fourth insulating layer 25, a third metal layer, a fifth insulating layer 26, a first planarization layer 27, a fourth metal layer, a second planarization layer 28, a fifth metal layer, and a third planarization layer 29, which are sequentially stacked on a substrate 10. The semiconductor layer includes: active layers of multiple pixel transistors, active layers of multiple blank transistors, active layers of multiple scan transistors, and active layers of multiple light-emitting transistors; the first metal layer includes: a lighting signal line, a scanning signal line, a reset signal line, a first plate PC11 of a first pixel capacitor, a second plate of a first scanning capacitor, a second plate of a second scanning capacitor, a first plate of a first light-emitting capacitor, a first plate of a second light-emitting capacitor, a second plate of a third light-emitting capacitor, control electrodes of the multiple pixel transistors, control electrodes of the multiple blank transistors, control electrodes of the multiple scan transistors, and control electrodes of the multiple light-emitting transistors; the second metal layer includes: an initial signal line, a second plate PC12 of the first pixel capacitor, a first plate of the first scanning capacitor, a first plate of the second scanning capacitor, a second plate of the first light-emitting capacitor, a second plate of the second light-emitting capacitor, and a first plate of the third light-emitting capacitor; the third metal layer includes: a third power line, a fourth power line, a first scanning clock signal line, a second scanning clock signal line, a first light-emitting clock signal line, a second light-emitting clock signal line, a scanning initial signal line, a light-emitting initial signal line, first and second electrodes of the multiple pixel transistors, first and second electrodes of the multiple blank transistors, first and second electrodes of the multiple scan transistors, and first and second electrodes of the multiple light-emitting transistors; the fourth metal layer includes: a data signal line and a first power line VDD; and the fifth metal layer includes: the connection electrode 21.

In the display substrate as shown in FIG. 28 and FIG. 29, an orthographic projection of the first power line on the substrate covers an orthographic projection of the first pixel capacitor on the substrate. In the display substrate, the orthographic projection of the first power line on the substrate covers the orthographic projection of the first pixel capacitor on the substrate, so that the area occupied by the pixel circuit can be reduced.

In an exemplary embodiment, the first power line and the data signal line may be arranged in the third metal layer.

In an exemplary embodiment, the first metal layer, the second metal layer, the third metal layer, the fourth metal layer, and the fifth metal layer may adopt a metal material, for example, any one or more of silver (Ag), copper (Cu), aluminum (Al), and molybdenum (Mo), or an alloy material of the abovementioned metals, for example, an aluminum-neodymium alloy (AlNd) or a molybdenum-niobium alloy (MoNb), and may be a single-layer structure, or a multilayer composite structure such as Mo/Cu/Mo.

In an exemplary embodiment, the first insulating layer, the second insulating layer, the third insulating layer, the fourth insulating layer, and the fifth insulating layer may adopt any one or more of silicon oxide (SiOx), silicon nitride (SiNx), and silicon oxynitride (SiON), and may be a single-layer, multilayer, or composite layer. The first insulating layer is called a Buffer layer and used to improve the water and oxygen resistance of the substrate. The second insulating layer and the third insulating layer are called Gate Insulator (GI) layers. The fourth insulating layer is called an Interlayer Dielectric (ILD) layer. The fifth insulating layer is called a Passivation (PVX) layer.

In an exemplary embodiment, the first planarization layer, the second planarization layer, and the third planarization layer may adopt an organic material such as polyimide, acrylic, or polyethylene terephthalate.

An embodiment of the present disclosure further provides a display device, including a display substrate.

In an exemplary embodiment, the display device may be a Liquid Crystal Display (LCD for short) or an Organic Light-Emitting Diode (OLED for short) display. The display device may be any product or component with a display function, such as a liquid crystal panel, electronic paper, an OLED panel, an active-matrix organic light-emitting diode (AMOLED for short) panel, a mobile phone, a tablet computer, a television, a display, a notebook computer, a digital photo frame, or a navigator.

The display substrate is the display substrate according to the foregoing embodiments, and the implementation principle and implementation effects are similar, which will not be repeated here.

An embodiment of the present disclosure further provides a preparation method for a display substrate, configured to prepare the display substrate. The preparation method for the display substrate according to the embodiment of the present disclosure includes the following steps.

In step S1, a substrate is provided.

In step S2, M rows of scanning signal lines and M rows of light-emitting signal lines, and a drive structure layer located in a display region are formed on the substrate.

In an exemplary embodiment, the drive structure layer includes: a pixel circuit array and a drive circuit array that extend in a column direction. The pixel circuit array and the drive circuit array are sequentially arranged in a row direction. The pixel circuit array includes: M rows and N column of pixel circuits, an $i^{th}$ row of pixel circuits being electrically connected to an $i^{th}$ row of scanning signal line and an $i^{th}$ row of light-emitting signal line. The drive circuit array includes: multiple drive circuits, and the drive circuits are arranged to provide drive signals to the scanning signal lines and the light-emitting signal lines.

In step S3, a light-emitting structure layer is formed on the drive structure layer.

In an exemplary embodiment, the light-emitting structure layer includes: M rows and N columns of light-emitting structures, and the pixel circuits are in one-to-one correspondence with the light-emitting structures and are electrically connected to the corresponding light-emitting structures.

The "patterning process" mentioned in this embodiment includes processes such as film deposition, photoresist coating, mask exposure, developing, etching and photoresist stripping. The "photolithography process" mentioned in this embodiment includes processes such as film coating, mask exposure, and developing. The deposition may adopt any one or more selected from sputtering, evaporation and chemical vapor deposition. The coating may adopt any one or more selected from spraying and spinning. The etching may adopt any one or more selected from dry etching and wet etching. The "thin film" refers to a thin film layer prepared from a certain material on a substrate by a process of depositing or coating. If a patterning process on the "thin film" is not required in the entire preparation process, the "thin film" may also be called "layer". If a patterning process on the "thin film" is required in the entire preparation process, it is called "thin film" before the patterning process, and called "layer" after the patterning process. The "layer" after the patterning process includes at least one "pattern".

In an exemplary embodiment, a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, a transparent conductive layer, and a third planarization layer are sequentially formed on the substrate.

In an exemplary embodiment, sequentially forming the first insulating layer, the semiconductor layer, the second insulating layer, the first metal layer, the third insulating layer, the second metal layer, the fourth insulating layer, the third metal layer, the fifth insulating layer, the first planarization layer, the fourth metal layer, the second planarization layer, the fifth metal layer, the transparent conductive layer, and the third planarization layer on the substrate may include: sequentially depositing a first insulating thin film and a semiconductor thin film on the substrate, and patterning the first insulating thin film and the semiconductor thin film through a patterning process to form a pattern of the first insulating layer and a pattern of the semiconductor layer; on the substrate on which the above patterns are formed, sequentially depositing a second insulating thin film and a first metal thin film, and patterning the second insulating thin film and the first metal thin film through a patterning process to form a pattern of the second insulating layer and a pattern of the first metal layer on the second insulating layer; on the substrate on which the above patterns are formed, sequentially depositing a third insulating thin film and a second metal thin film, and patterning the third insulating thin film and the second metal thin film through a patterning process to form a pattern of the third insulating film layer and a pattern of the second metal layer on the third insulating layer; on the substrate on which the above patterns are formed, sequentially depositing a fourth insulating thin film and a third metal thin film, and patterning the fourth insulating thin film and the third metal thin film through a patterning process to form a pattern of the fourth insulating layer and a pattern of the third metal layer on the fourth insulating layer; on the substrate on which the above patterns are formed, depositing a fifth insulating thin film, and patterning the fifth insulating thin film through a patterning process to form a pattern of the fifth insulating layer; coating the substrate on which the above patterns are formed with a first planarization film, and forming a pattern of the first planarization layer through a photolithography process; on the substrate on which the above patterns are formed, depositing a fourth metal thin film, and forming a pattern of the fourth metal layer through a patterning process; coating the substrate on which the above patterns are formed with a second planarization film, and forming a pattern of the second planarization layer through a photolithography process; on the substrate on which the above patterns are formed, depositing a fifth metal thin film, and forming a pattern of the fifth metal layer through a patterning process; on the substrate on which the above patterns are formed, depositing a transparent conductive thin film, and forming a pattern of the transparent conductive layer through a patterning process; and coating the substrate on which the above patterns are formed with a third planarization film, and forming a pattern of the third planarization layer through a photolithography process.

In an exemplary embodiment, forming the drive structure layer located in the display region on the substrate may include: sequentially forming a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, and a third planarization layer on the substrate.

In an exemplary embodiment, sequentially forming the first insulating layer, the semiconductor layer, the second insulating layer, the first metal layer, the third insulating layer, the second metal layer, the fourth insulating layer, the third metal layer, the fifth insulating layer, the first planarization layer, the fourth metal layer, the second planarization layer, the fifth metal layer, and the third planarization layer on the substrate may include: sequentially depositing a first insulating thin film and a semiconductor thin film on the substrate, and patterning the first insulating thin film and the semiconductor thin film through a patterning process to form a pattern of the first insulating layer and a pattern of the semiconductor layer; on the substrate on which the above patterns are formed, sequentially depositing a second insulating thin film and a first metal thin film, and patterning the second insulating thin film and the first metal thin film through a patterning process to form a pattern of the second insulating layer and a pattern of the first metal layer on the second insulating layer; on the substrate on which the above patterns are formed, sequentially depositing a third insulating thin film and a second metal thin film, and patterning the third insulating thin film and the second metal thin film through a patterning process to form a pattern of the third insulating film layer and a pattern of the second metal layer on the third insulating layer; on the substrate on which the above patterns are formed, sequentially depositing a fourth insulating thin film and a third metal thin film, and patterning the fourth insulating thin film and the third metal thin film through a patterning process to form a pattern of the fourth insulating layer and a pattern of the third metal layer on the fourth insulating layer; on the substrate on which the above patterns are formed, depositing a fifth insulating thin film, and patterning the fifth insulating thin film through a patterning process to form a pattern of the fifth insulating layer; coating the substrate on which the above patterns are formed with a first planarization film, and forming a pattern of the first planarization layer through a photolithography process; on the substrate on which the above patterns are formed, depositing a fourth metal thin film, and forming a pattern of the fourth metal layer through a patterning process; coating the substrate on which the above patterns are formed with a second planarization film, and forming a pattern of the second planarization layer through a photolithography process; on the substrate on which the above patterns are formed, depositing a fifth metal thin film, and forming a pattern of the fifth metal layer through a patterning process; and coating the substrate on which the above patterns are formed with a third planarization film, and forming a pattern of the third planarization layer through a photolithography process.

In an exemplary embodiment, forming the light-emitting structure layer on the drive structure layer includes: sequentially forming a first electrode layer, a pixel defining layer, a light-emitting layer, and a second electrode layer on the drive structure layer. Sequentially forming the first electrode layer, the pixel defining layer, the light-emitting layer, and the second electrode layer on the drive structure layer may include: coating the substrate on which the pattern of the third planarization layer is formed with a first electrode thin film, and forming a pattern of the first electrode layer through a patterning process; coating the substrate on which the above patterns are formed with a pixel defining thin film, and forming a pattern of the pixel defining layer (PDL) through masking, exposure, and developing processes, wherein the pixel defining layer is provided with a pixel opening, and the pixel definition thin film in the pixel opening is developed to expose a surface of the first electrode. The pixel defining layer is provided with a first opening, and the pixel defining thin film in the first opening is developed to expose a surface of the connection electrode. A light-emitting layer and a second electrode layer are sequentially formed on the substrate on which the above patterns are formed.

In an exemplary embodiment, after the light-emitting structure layer is formed on the drive structure layer, the preparation method for a display substrate may further include: forming an encapsulation layer and a spacer on the light-emitting structure layer.

The accompanying drawings of the present disclosure only involve the structures involved in the embodiments of the present disclosure, and the other structures may refer to conventional designs.

For clarity, in the accompanying drawings used to describe the embodiments of the present disclosure, the thickness and dimension of a layer or a micro structure is enlarged. It is to be understood that when an element such as a layer, film, region or substrate is described as being "on" or "under" another element, it can be "directly" located "on" or "under" the other element, or an intermediate element may exist.

Although the above is the implementation modes disclosed in the present disclosure, the contents are only implementation modes for easily understanding of the present disclosure and not intended to limit the present disclosure. Any skilled person in the art to which the present disclosure pertains can make any modifications and variations in implementation manners and details without departing from the spirit and scope of the present disclosure. However, the protection scope of the present disclosure should be subject to the scope defined by the appended claims.

The invention claimed is:

1. A display substrate, comprising a display region and a non-display region, the display substrate comprising: a substrate, and a drive structure layer and a light-emitting structure layer that are stacked on the substrate and located in the display region, the display substrate further comprising: M rows of scanning signal lines and M rows of light-emitting signal lines; wherein the light-emitting structure layer comprises: M rows and N columns of light-emitting structures, the drive structure layer comprises a pixel circuit array and a drive circuit array that extend in a column direction, and the pixel circuit array and the drive circuit array are arranged in a row direction;

wherein the pixel circuit array comprises: M rows and N columns of pixel circuits, the pixel circuits are in one-to-one correspondence with the light-emitting structures and electrically connected to corresponding light-emitting structures, and an $i^{th}$ row of pixel circuits are electrically connected to an $i^{th}$ row of scanning signal line and an $i^{th}$ row of light-emitting signal line, where $1 \leq i \leq M$; and the drive circuit array comprises: at least one scanning drive circuit and at least one light-emitting drive circuit, the scanning drive circuit is arranged to provide a drive signal to a scanning signal line, and the light-emitting drive circuit is arranged to provide a drive signal to a light-emitting signal line.

2. The display substrate according to claim 1, wherein the drive structure layer further comprises: a blank circuit array; the blank circuit array is arranged between the pixel circuit array and the drive circuit array; and the blank circuit array comprises: multiple blank circuits, the blank circuits being electrically connected to the scanning signal lines and the light-emitting signal lines.

3. The display substrate according to claim 2, further comprising: a first power line, a second power line and data signal lines that extend in the column direction, and a reset signal line and an initial signal line that extend in the row direction, wherein the light-emitting structures are electrically connected to the second power line;

a pixel circuit comprises: a first pixel transistor to a seventh pixel transistor, and a first pixel capacitor; wherein a control electrode of the first pixel transistor is electrically connected to the reset signal line, a first electrode of the first pixel transistor is electrically connected to a first pixel node, and a second electrode of the first pixel transistor is electrically connected to the initial signal line; a control electrode of the second pixel transistor is electrically connected to a scanning signal line, a first electrode of the second pixel transistor is electrically connected to the first pixel node, and a second electrode of the second pixel transistor is electrically connected to a second pixel node; a control electrode of the third pixel transistor is electrically connected to the first pixel node, a first electrode of the third pixel transistor is electrically connected to a third pixel node, and a second electrode of the third pixel transistor is electrically connected to the second pixel node; a control electrode of the fourth pixel transistor is electrically connected to the scanning signal line, a first electrode of the fourth pixel transistor is electrically connected to a data signal line, and a second electrode of the fourth pixel transistor is electrically connected to the third pixel node; a control electrode of the fifth pixel transistor is electrically connected to a light-emitting signal line, a first electrode of the fifth pixel transistor is electrically connected to the first power line, and a second electrode of the fifth pixel transistor is electrically connected to the third pixel node; a control electrode of the sixth pixel transistor is electrically connected to the light-emitting signal line, a first electrode of the sixth pixel transistor is electrically connected to the second pixel node, and a second electrode of the sixth pixel transistor is electrically connected to a light-emitting structure; a control electrode of the seventh pixel transistor is electrically connected to the scanning signal line, a first electrode of the seventh pixel transistor is electrically connected to the initial signal line, and a second electrode of the seventh pixel transistor is electrically connected to the light-emitting structure; and a first plate of the first pixel capacitor is electrically connected to the first pixel node, and a second plate of the first pixel capacitor is electrically connected to the first power line.

4. The display substrate according to claim 3, wherein the light-emitting structure layer comprises: a first electrode layer, a pixel defining layer, a light-emitting layer, and a second electrode layer that are sequentially stacked on the drive structure layer; the first electrode layer comprises: multiple first electrodes, the light-emitting layer comprises: multiple organic light-emitting layers, the second electrode layer comprises: multiple second electrodes, and each light-emitting structure comprises: a first electrode, an organic light-emitting layer, and a second electrode;

for each pixel circuit, an orthographic projection of the second electrode of the sixth pixel transistor on the substrate and an orthographic projection of the first electrode in the light-emitting structure connected to the pixel circuit on the substrate have no overlap; and the drive structure layer further comprises: a connection electrode, wherein the connection electrode is located between the pixel circuit and the light-emitting structure, and is electrically connected to the second electrode of the sixth pixel transistor in the pixel circuit and the first electrode in the light-emitting structure, respectively;

wherein the connection electrode comprises: a first connecting portion and a second connecting portion;

the first connecting portion is arranged on a side, close to the substrate, of the second connecting portion, the first connecting portion is electrically connected to the second electrode of the sixth pixel transistor in the pixel circuit and the second connecting portion, respectively, and the second connecting portion is electrically connected to the first electrode in the light-emitting structure; and the first connecting portion and the second connecting portion are of an integrated structure, or, the first connecting portion is a metal electrode, and the second connecting portion is a transparent electrode.

5. The display substrate according to claim 4, wherein when the first connecting portion and the second connecting portion are of an integrated structure, the drive structure layer comprises: a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, and a third planarization layer that are sequentially stacked on the substrate;

the semiconductor layer comprises: active layers of multiple pixel transistors, active layers of multiple blank transistors, active layers of multiple scan transistors, and active layers of multiple light-emitting transistors; the first metal layer comprises: a lighting signal line, a scanning signal line, a reset signal line, a first plate of a first pixel capacitor, a second plate of a first scanning capacitor, a second plate of a second scanning capacitor, a first plate of a first light-emitting capacitor, a first plate of a second light-emitting capacitor, a second plate of a third light-emitting capacitor, control electrodes of the multiple pixel transistors, control electrodes of the multiple blank transistors, control electrodes of the multiple scan transistors, and control electrodes of the multiple light-emitting transistors; the second metal layer comprises: an initial signal line, a second plate of the first pixel capacitor, a first plate of the first scanning capacitor, a first plate of the second scanning capacitor, a second plate of the first light-emitting capacitor, a second plate of the second light-emitting capacitor, and a first plate of the third light-emitting capacitor; the third metal layer comprises: a third power line, a fourth power line, a first scanning clock signal line, a second scanning clock signal line, a first light-emitting clock signal line, a second light-emitting clock signal line, a scanning initial signal line, a light-emitting initial signal line, first and second electrodes of the multiple pixel transistors, first and second electrodes of the multiple blank transistors, first and second electrodes of the multiple scan transistors, and first and second electrodes of the multiple light-emitting transistors; the fourth metal layer comprises: a data signal line and a first power line; and the fifth metal layer comprises: the connection electrode; and an orthographic projection of the first power line on the substrate at least partially overlaps with an orthographic projection of the first pixel capacitor on the substrate.

6. The display substrate according to claim 4, wherein when the first connecting portion is a metal electrode and the second connecting portion is a transparent electrode, the drive structure layer comprises: a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, a transparent conductive layer, and a third planarization layer that are sequentially stacked on the substrate;

the semiconductor layer comprises: active layers of multiple pixel transistors, active layers of multiple blank transistors, active layers of multiple scan transistors, and active layers of multiple light-emitting transistors; the first metal layer comprises: a light-emitting signal line, a scanning signal line, a reset signal line, a first plate of a first pixel capacitor, a second plate of a first scanning capacitor, a second plate of a second scanning capacitor, a first plate of a first light-emitting capacitor, a first plate of a second light-emitting capacitor, a second plate of a third light-emitting capacitor, control electrodes of the multiple pixel transistors, control electrodes of the multiple blank transistors, control electrodes of the multiple scan transistors, and control electrodes of multiple light-emitting transistors; the second metal layer comprises: an initial signal line, a second plate of the first pixel capacitor, a first plate of the first scanning capacitor, a first plate of the second scanning capacitor, a second plate of the first light-emitting capacitor, a second plate of the second light-emitting capacitor, and a first plate of the third light-emitting capacitor; the third metal layer comprises: a third power line, a fourth power line, a first scanning clock signal line, a second scanning clock signal line, a first light-emitting clock signal line, a second light-emitting clock signal line, a scanning initial signal line, a light-emitting initial signal line, first and second electrodes of the multiple pixel transistors, first and second electrodes of the multiple blank transistors, first and second electrodes of the multiple scan transistors, and first and second electrodes of the multiple light-emitting transistors; the fourth metal layer comprises: a data signal line and a first power line; the fifth metal layer comprises: the first connecting portion, and the transparent conductive layer comprises: the second connecting portion; and an orthographic projection of the first power line on the substrate at least partially overlaps with an orthographic projection of the first pixel capacitor on the substrate.

7. The display substrate according to claim 2, further comprising a first power line that extends in the column direction and a reset signal line and an initial signal line that extend in the row direction; wherein the blank circuit comprises: a first blank transistor to a seventh blank transistor, and a first blank capacitor; wherein a control electrode of the first blank transistor is electrically connected to the reset signal line, a first electrode of the first blank transistor is electrically connected to a first blank node, and a second electrode of the first blank transistor is electrically connected to the initial signal line; a control electrode of the second blank transistor is electrically connected to a scanning signal line, a first electrode of the second blank transistor is electrically connected to the first blank node, and a second electrode of the second blank transistor is electrically connected to a second blank node; a control electrode of the third blank transistor is electrically connected to the first blank node, a first electrode of the third blank transistor is electrically connected to a third blank node, and a second electrode of the third blank transistor is electrically connected to the second blank node; a control electrode of the fourth blank transistor is electrically connected to the scanning signal line, a first electrode of the fourth blank transistor is floating, and a second electrode of the fourth blank transistor is electrically connected to the third blank node; a control electrode of the fifth blank transistor is electrically connected to a light-emitting signal line, a first electrode of the fifth blank transistor is electrically connected to the first power line, and a second electrode of the fifth blank transistor is electrically connected to the third blank node; a control electrode of the sixth blank transistor is electrically connected to the light-emitting signal line, a first electrode of the sixth blank transistor is electrically connected to the second blank node, and a second electrode of the sixth blank transistor is floating or electrically connected to the first power line; a control electrode of the seventh blank transistor is electrically connected to the scanning signal line, a first electrode of the seventh blank transistor is electrically connected to the initial signal line, and a second electrode of the seventh blank transistor is floating or electrically connected to the first power line; and a first plate of the first blank capacitor is electrically connected to the first blank node, and a second plate of the first blank capacitor is electrically connected to the first power line.

8. The display substrate according to claim 1, wherein the display region comprises: an arc display boundary at one or more ends, and the display region comprises a first boundary and a second boundary that are arranged in opposite and a third boundary and a fourth boundary that are arranged in opposite; wherein a length of the first boundary is greater than a length of the third boundary;

the first boundary and the second boundary extend in the column direction and are of a non-linear structure, the arc display boundary is located within the first boundary and the second boundary, and the third boundary and the fourth boundary extend in the row direction and are of a linear structure; and at least part of pixel circuits close to the arc display boundary are arranged in an arc shape.

9. The display substrate according to claim 8, wherein the pixel circuit array comprises: a first pixel circuit array and a second pixel circuit array that are sequentially arranged in the row direction; the drive circuit array comprises: a first drive circuit array, a second drive circuit array, and a third drive circuit array that are sequentially arranged in the row direction;

the first pixel circuit array is located between the first drive circuit array and the second drive circuit array, the second pixel circuit array is located between the second drive circuit array and the third drive circuit array;

at least part of drive circuits, close to the arc display boundary, in the first drive circuit array are arranged in an arc shape; at least part of drive circuits, close to the arc display boundary, in the third drive circuit array are arranged in an arc shape; and multiple drive circuits in the second drive circuit array are linearly arranged;

wherein the first drive circuit array and the third drive circuit array comprise: a scanning drive circuit, and the second drive circuit array comprises: a light-emitting drive circuit.

10. The display substrate according to claim 9, wherein when the drive structure layer further comprises a blank circuit array, the blank circuit array comprises: a first blank circuit array, a second blank circuit array, a third blank circuit array, and a fourth blank circuit array;

the first blank circuit array is located between the first drive circuit array and the first pixel circuit array, the second blank circuit array is located between the first pixel circuit array and the second drive circuit array, the third blank circuit array is located between the second drive circuit array and the second pixel circuit array, and the fourth blank circuit array is located between the second pixel circuit array and the third drive circuit array; and at least part of blank circuits, close to the arc display boundary, in the first blank circuit array are arranged in an arc shape; multiple blank circuits in the second blank circuit array and the third blank circuit array are linearly arranged; and at least part of blank circuits, close to the arc display boundary, in the fourth blank circuit array are arranged in an arc shape.

11. The display substrate according to claim 8, wherein the drive circuit array comprises: a first drive circuit array and a second drive circuit array that are sequentially arranged in the row direction;

the first drive circuit array is arranged at a side, close to the first boundary of the display region, of the pixel circuit array, and the second drive circuit array is arranged at a side, close to the second boundary of the display region, of the pixel circuit array;

at least part of drive circuits, close to the arc display boundary, in the first drive circuit array are arranged in an arc shape; and at least part of drive circuits, close to the arc display boundary, in the second drive circuit array are arranged in an arc shape;

wherein when the drive structure layer further comprises a blank circuit array, the blank circuit array comprises: a first blank circuit array and a second blank circuit array;

the first blank circuit array is located between the first drive circuit array and the pixel circuit array, and the second blank circuit array is located between the pixel circuit array and the second drive circuit array;

at least part of blank circuits, close to the arc display boundary, in the first blank circuit array are arranged in an arc shape; and at least part of blank circuits, close to the arc display boundary, in the second blank circuit array are arranged in an arc shape.

12. The display substrate according to claim 1, wherein the pixel circuit array comprises: a second pixel circuit array, a first pixel circuit array, and a third pixel circuit array that are sequentially arranged in the row direction; the drive circuit array comprises: a first drive circuit array and a second drive circuit array that are arranged in the row direction;

the first drive circuit array is located between the first pixel circuit array and the second pixel circuit array, and the second drive circuit array is located in the first pixel circuit array and the third pixel circuit array; and multiple drive circuits in the first drive circuit array and the second drive circuit array are linearly arranged.

13. The display substrate according to claim 12, wherein when the drive structure layer further comprises a blank circuit array, the blank circuit array comprises: a first blank circuit array, a second blank circuit array, a third blank circuit array, and a fourth blank circuit array;

the first blank circuit array is located between the second pixel circuit array and the first drive circuit array, the second blank circuit array is located between the first drive circuit array and the first pixel circuit array, the third blank circuit array is located between the first pixel circuit array and the second drive circuit array, and the fourth blank circuit array is located between the second drive circuit array and the third pixel circuit array; and multiple blank circuits of the first blank circuit array, the second blank circuit array, the third blank circuit array, and the fourth blank circuit array are linearly arranged.

14. The display substrate according to claim 12, wherein the first drive circuit array and the second drive circuit array both comprise: a scanning drive circuit and a light-emitting drive circuit; the scanning drive circuit and the light-emitting drive circuit in a same drive circuit array are arranged in the row direction;

or, the first drive circuit array comprises: a scanning drive circuit, and the second drive circuit array comprises: a light-emitting drive circuit.

15. The display substrate according to claim 1, further comprising a third power line, a fourth power line, a first scanning clock signal line, a second scanning clock signal line, and a scanning initial signal line that extend in the column direction; wherein the scanning drive circuit comprises: multiple cascaded first shift registers that are sequentially arranged in the column direction, and each first shift resister comprises: a first scan transistor to an eighth scan transistor, a first scanning capacitor, a second scanning capacitor, a scanning signal input terminal, a scanning signal output terminal, a first scanning clock signal terminal, a second scanning clock signal terminal, a first scanning power terminal, and a second scanning power terminal;

a control electrode of the first scan transistor is electrically connected to the first scanning clock signal terminal, a first electrode of the first scan transistor is electrically connected to the scanning signal input terminal, and a second electrode of the first scan transistor is electrically connected to a first scan node; a control electrode of the second scan transistor is electrically connected to the first scan node, a first electrode of the second scan transistor is electrically connected to the first scanning clock signal terminal, and a second electrode of the second scan transistor is electrically connected to a second scan node; a control electrode of the third scan transistor is electrically connected to the first scanning clock signal terminal, a first electrode of the third scan transistor is electrically connected to the second scanning power terminal, and a second electrode of the third scan transistor is electrically connected to the second scan node; a control electrode of the fourth scan transistor is electrically connected to the second scan node, a first electrode of the fourth scan transistor is electrically connected to the first scanning power terminal, and a second electrode of the fourth scan transistor is electrically connected to the scanning signal output terminal; a control electrode of the fifth scan transistor is electrically connected to a third scan node, a first electrode of the fifth scan transistor is electrically connected to the scanning signal output terminal, and a second electrode of the fifth scan transistor is electrically connected to the second scanning clock signal terminal; a control electrode of the sixth scan transistor is electrically connected to the second scan node, a first electrode of the sixth scan transistor is electrically connected to the first scanning power terminal, and a second electrode of the sixth scan transistor is electrically connected to a first electrode of the seventh scan transistor; a control electrode of the seventh scan transistor is electrically connected to the second scanning clock signal terminal, and a second electrode of the seventh scan transistor is electrically connected to the first scan node; a control electrode of the eighth scan transistor is electrically connected to the second scanning power terminal, a first electrode of the eighth scan transistor is electrically connected to the first scan node, and a second electrode of the eighth scan transistor is electrically connected to the third scan node; a first plate of the first scanning capacitor is electrically connected to the first scanning power terminal, and a second plate of the first scanning capacitor is electrically connected to the second scan node; and a first plate of the second scanning capacitor is electrically connected to the scanning signal output terminal, and a second plate of the second scanning capacitor is electrically connected to the third scan node; and a scanning signal input terminal of a first-stage first shift register is electrically connected to the scanning initial signal line, a scanning signal output terminal of an $(i-1)^{th}$-stage first shift register is electrically connected to a scanning signal input terminal of an $i^{th}$-stage first shift register, first scanning power terminals of all the first shift registers are electrically connected to the third power line, second scanning power terminals of the first shift registers are electrically connected to the fourth power line, a first scanning clock signal terminal of an odd-stage first shift register is electrically connected to the first scanning clock signal line, a second scanning clock signal terminal of the odd-stage first shift register is electrically connected to the second scanning clock signal line, a first scanning clock signal terminal of an even-stage first shift register is electrically connected to the second scanning clock signal line, a second scanning clock signal terminal of the even-stage first shift register is electrically connected to the first scanning clock signal line, a scanning signal output terminal of a first shift register is electrically connected to a scanning signal line, where i is a positive integer greater than or equal to 2.

16. The display substrate according to claim 1, further comprising a third power line, a fourth power line, a first light-emitting clock signal line, a second light-emitting clock signal line, and a light-emitting initial signal line that extend in the column direction; wherein the light-emitting drive circuit comprises: multiple cascaded second shift registers that are sequentially arranged in the column direction, and each second shift register comprises: a first light-emitting transistor to a tenth light-emitting transistor, a first light-emitting capacitor to a third light-emitting capacitor, a light-emitting signal input terminal, a light-emitting signal output terminal, a first light-emitting clock signal terminal, a second light-emitting clock signal terminal, a first light-emitting power terminal, and a second light-emitting power terminal;

a control electrode of the first light-emitting transistor is electrically connected to the first light-emitting clock signal terminal, a first electrode of the first light-emitting transistor is electrically connected to the light-emitting signal input terminal, and a second electrode of the first light-emitting transistor is electrically connected to a first light-emitting node; a control electrode of the second light-emitting transistor is electrically connected to the first light-emitting node, a first electrode of the second light-emitting transistor is electrically connected to the first light-emitting clock signal terminal, and a second electrode of the second light-emitting transistor is electrically connected to a second light-emitting node; a control electrode of the third light-emitting transistor is electrically connected to the first light-emitting clock signal terminal, a first electrode of the third light-emitting transistor is electrically connected to the second light-emitting power terminal, and a second electrode of the third light-emitting transistor is electrically connected to the second light-emitting node; a control electrode of the fourth light-emitting transistor is electrically connected to the second light-emitting clock signal terminal, a first electrode of the fourth light-emitting transistor is electrically connected to the first light-emitting node, and a second electrode of the fourth light-emitting transistor is electrically connected to a first electrode of the fifth light-emitting transistor; a control electrode of the fifth light-emitting transistor is electrically connected to the second light-emitting node, and a second electrode of the fifth light-emitting transistor is electrically connected to the first light-emitting power terminal; a control electrode of the sixth light-emitting transistor is electrically connected to the second light-emitting node, a first electrode of the sixth light-emitting transistor is electrically connected to the second light-emitting clock signal terminal, and a second electrode of the sixth light-emitting transistor is electrically connected to a third light-emitting node; a control electrode of the seventh light-emitting transistor is electrically connected to the second light-emitting clock signal terminal, a first electrode of the seventh light-emitting transistor is electrically connected to the third light-emitting node, and a second electrode of the seventh light-emitting transistor is electrically connected to a fourth light-emitting node; a control electrode of the eighth light-emitting transistor is electrically connected to the first light-emitting node, a first electrode of the eighth light-emitting transistor is electrically connected to the first light-emitting power terminal, and a second electrode of the eighth light-emitting transistor is electrically connected to the fourth light-emitting node; a control electrode of the ninth light-emitting transistor is electrically connected to the fourth light-emitting node, a first electrode of the ninth light-emitting transistor is electrically connected to the light-emitting signal output terminal, and a second electrode of the ninth light-emitting transistor is electrically connected to the first light-emitting power terminal; a control electrode of the tenth light-emitting transistor is electrically connected to the first light-emitting node, a first electrode of the tenth light-emitting transistor is electrically connected to the second light-emitting power terminal, and a second electrode of the tenth light-emitting transistor is electrically connected to the light-emitting signal output terminal; a first plate of the first light-emitting capacitor is electrically connected to the second light-emitting node, a second plate of the first light-emitting capacitor is electrically connected to the third light-emitting node; a first plate of the second light-emitting capacitor is electrically connected to the first light-emitting node, and a second plate of the second light-emitting capacitor is electrically connected to the second light-emitting clock signal terminal; and a first plate of the third light-emitting capacitor is electrically connected to the fourth light-emitting node, and a second plate of the third light-emitting capacitor is electrically connected to the first light-emitting power terminal; and a light-emitting signal input terminal of a first-stage second shift register is electrically connected to the light-emitting initial signal line, a light-emitting signal output terminal of an $(i-1)^{th}$-stage second shift register is electrically connected to a light-emitting signal input terminal of an $i^{th}$-stage second shift register, first light-emitting power terminals of all the second shift registers are electrically connected to the third power line, second light-emitting power terminals of the second shift registers are electrically connected to the fourth power line, a first light-emitting clock signal terminal of an odd-stage second shift register is electrically connected to the first light-emitting clock signal line, a second light-emitting clock signal terminal of the odd-stage second shift register is electrically connected to the second light-emitting clock signal line, a first light-emitting clock signal terminal of an even-stage second shift register is electrically connected to the second light-emitting clock signal line, a second light-emitting clock signal terminal of the even-stage second shift register is electrically connected to the first light-emitting clock signal line, and a light-emitting signal output terminal of a second shift register is electrically connected to a light-emitting signal line, where i is a positive integer greater than or equal to 2.

17. The display substrate according to claim 1, further comprising an encapsulation layer and a spacer;

the encapsulation layer is arranged on a side, away from the substrate, of the light-emitting structure, and the spacer is arranged on a side, away from the substrate, of the encapsulation layer.

18. A display device, comprising the display substrate according to claim 1.

19. A preparation method for a display substrate, comprising:

providing a substrate;

forming, on the substrate, M rows of scanning signal lines and M rows of light-emitting signal lines and a drive structure layer in a display region; wherein the drive structure layer comprises: a pixel circuit array and a driving circuit array that extend in a column direction; the pixel circuit array and the drive circuit array are arranged in a row direction; the pixel circuit array comprises: M rows and N columns of pixel circuits, an $i^{th}$ row of pixel circuits are electrically connected to an $i^{th}$ row of scanning signal line and an $i^{th}$ row of light-emitting signal line, where $1 \leq i \leq M$; the drive circuit array comprises: at least one scanning drive circuit and at least one light-emitting drive circuit, the scanning drive circuit is arranged to provide a drive signal to a scanning signal line, and the light-emitting drive circuit is arranged to provide a drive signal to a light-emitting signal line; and forming a light-emitting structure layer on the drive structure layer; wherein the light-emitting structure layer comprises: M rows and N columns of light-emitting structures, the pixel circuits are in one-to-one correspondence with the light-emitting structures and are electrically connected to corresponding light-emitting structures.

20. The method according to claim 19, wherein forming the drive structure layer in the display region on the substrate comprises:

sequentially forming a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, and a third planarization layer on the substrate;

or, sequentially forming a first insulating layer, a semiconductor layer, a second insulating layer, a first metal layer, a third insulating layer, a second metal layer, a fourth insulating layer, a third metal layer, a fifth insulating layer, a first planarization layer, a fourth metal layer, a second planarization layer, a fifth metal layer, a transparent conductive layer, and a third planarization layer on the substrate;

forming the light-emitting structure layer on the drive structure layer comprises:

sequentially forming a first electrode layer, a pixel defining layer, a light-emitting layer, and a second electrode layer on the drive structure layer; and after forming the light-emitting structure layer on the drive structure layer, the method further comprises:

forming an encapsulation layer and a spacer on the light-emitting structure layer.

* * * * *